United States Patent
Lee et al.

(10) Patent No.: US 10,877,613 B2
(45) Date of Patent: Dec. 29, 2020

(54) TOUCH DISPLAY PANEL WITH AUXILIARY SWITCH CIRCUIT

(71) Applicant: AU Optronics Corporation, Hsin-Chu (TW)

(72) Inventors: Chia-Chi Lee, Hsin-Chu (TW); Che-Chia Chang, Hsin-Chu (TW); Tsung-Yen Tu, Hsin-Chu (TW); Zeng-De Chen, Hsin-Chu (TW); Ming-Hung Chuang, Hsin-Chu (TW); Wen-Rei Guo, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/369,867

(22) Filed: Mar. 29, 2019

(65) Prior Publication Data
US 2020/0110483 A1   Apr. 9, 2020

(30) Foreign Application Priority Data
Oct. 5, 2018   (TW) .............................. 107135306 A

(51) Int. Cl.
*G06F 3/041* (2006.01)
*G06F 3/044* (2006.01)

(52) U.S. Cl.
CPC ............ *G06F 3/044* (2013.01); *G06F 3/0416* (2013.01)

(58) Field of Classification Search
CPC ................... G06F 3/044; G06F 3/0416; G06F 2203/04107
See application file for complete search history.

(56) References Cited

U.S. PATENT DOCUMENTS

| | | | |
|---|---|---|---|
| 9,024,913 B1 | 5/2015 | Jung et al. | |
| 10,067,601 B2* | 9/2018 | Kurasawa | G06F 3/0412 |
| 10,303,291 B2* | 5/2019 | Kurasawa | G06F 3/0416 |
| 2011/0115733 A1* | 5/2011 | Shih | G06F 3/044 |
| | | | 345/173 |
| 2015/0116263 A1* | 4/2015 | Kim | G06F 3/041661 |
| | | | 345/174 |
| 2016/0291784 A1 | 10/2016 | Zhai | |
| 2017/0262121 A1* | 9/2017 | Kurasawa | G06F 3/0416 |
| 2018/0348951 A1* | 12/2018 | Kurasawa | G06F 3/044 |
| 2019/0243507 A1* | 8/2019 | Kurasawa | G06F 3/044 |

FOREIGN PATENT DOCUMENTS

| | | |
|---|---|---|
| CN | 104699315 A | 6/2015 |
| CN | 104793827 A | 7/2015 |
| CN | 105739787 A | 7/2016 |
| TW | 201704960 A | 2/2017 |

* cited by examiner

*Primary Examiner* — Stephen G Sherman
(74) *Attorney, Agent, or Firm* — WPAT, PC

(57) ABSTRACT

A touch display panel includes a touch circuit, a touch electrode layer and a plurality of multiplexers. The touch electrode layer includes a plurality of first electrodes. Each of the multiplexers is electrically connected to the touch circuit and the first electrodes. Each of the multiplexers is configured to output a touch sensing signal, a first guarding signal and a second guarding signal according to a first guarding control signal, a second guarding control signal, a first touch control signal, and a second touch control signal.

22 Claims, 18 Drawing Sheets

TOUCH DISPLAY PANEL WITH AUXILIARY SWITCH CIRCUIT

CROSS-REFERENCE TO RELATED APPLICATION

This application claims priority to Taiwanese Application Serial Number 107135306, filed on Oct. 5, 2018, which is herein incorporated by reference.

BACKGROUND

Field of Invention

The present invention relates to a touch display panel. More particularly, the present invention relates to a touch display panel having compensation circuit.

Description of Related Art

Touch technology with full in cell architecture includes the mutual capacitance mode and the self-capacitance mode, and the touch sensing electrode of the self-capacitance mode needs to be connected to the control chip with wires. It is caused the number of wires and the size of the control chip to increase with the size of the touch panel. Currently, the multiplexers are utilized to save the number of wires and reduce the size of the control chip. Moreover, the touch sensing electrode of the mutual capacitance mode is usually arranged to overlap with the pixel array of the display panel, and it is caused the parasitic capacitance to increase to reduce the sensitivity of the touch sensing electrode.

SUMMARY

The invention provides a touch display panel. The touch display panel includes a touch circuit, a touch electrode layer, a plurality of multiplexers and a switch circuit. The touch electrode layer includes a plurality of first electrodes. The plurality of multiplexers, each of the multiplexers is electrically coupled to the touch circuit and the plurality of first electrodes, and each of the multiplexers is configured to output a touch sensing signal and a guarding signal according to a first guarding control signal, a second guarding control signal, a first touch control signal, and a second touch control signal. The switch circuit includes a plurality of switch units, each of the switch units is electrically coupled to the plurality of first electrodes, and each of the switch units is configured to output the guarding signal according to the first guarding control signal and the second guarding control signal.

The invention provides a touch display panel. The touch display panel includes a touch circuit, a touch electrode layer and a plurality of multiplexers. The touch electrode layer includes a plurality of first electrodes. The plurality of multiplexers, each of the multiplexers is electrically coupled to the touch circuit and the plurality of first electrodes, and each of the multiplexers is configured to output a touch sensing signal, a first guarding signal and a second guarding signal according to a first guarding control signal, a second guarding control signal, a first touch control signal, and a second touch control signal.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
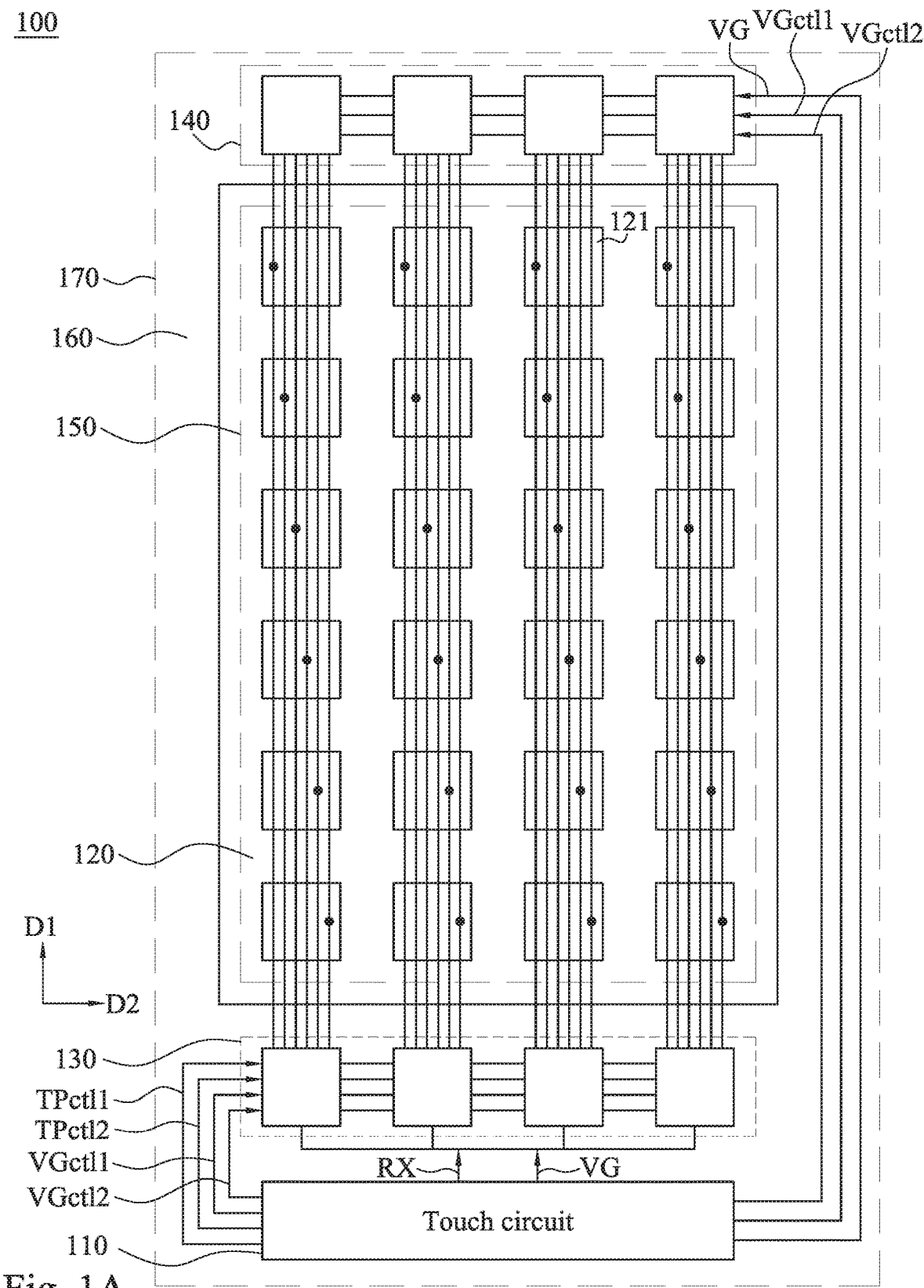
FIG. 1A is a functional block diagram of a touch display panel according to one embodiment of the present disclosure.

Reference will now be made in detail to the present embodiments of the invention, examples of which are illustrated in the accompanying drawings. Wherever possible, the same reference labels are used in the drawings and the description to refer to the same or like parts, components, or operations.

FIG. 1A is a functional block diagram of a touch display panel 100 according to one embodiment of the present disclosure. As shown in FIG. 1A, the touch display panel 100 includes a touch circuit 110, a touch electrode layer 120, a plurality of multiplexers 130 and a switch circuit 140. The touch electrode layer 120 includes a plurality of first electrodes 121. The multiplexers 130 are electrically coupled to the touch circuit 110 and the first electrodes 121. The touch circuit 110 is configured to output a first guarding control signal VGctl1, a second guarding control signal VGctl2, a first touch control signal TPctl1, a second touch control signal TPctl2, a touch sensing signal RX and a guarding signal VG. The multiplexers 130 are configured to output the touch sensing signal RX and the guarding signal VG to the first electrodes 121 according to the first guarding control signal VGctl1, the second guarding control signal VGctl2, the first touch control signal TPctl1, and the second touch control signal TPctl2. The switch circuit 140 is configured to output the guarding signal VG to the first electrodes 121 according to the first guarding control signal VGctl1 and the second guarding control signal VGctl2.

In the embodiment, as shown in FIG. 1A, the touch electrode layer 120 is disposed on an upper surface of an array substrate 170, and the array substrate 170 includes a display area 150 and a peripheral area 160 adjacent to the display area 150. The touch electrode layer 120 is disposed in the display area 150 and the touch circuit 110 and the multiplexers 130 are disposed in a side of the peripheral area 160, and the switch circuit 140 is disposed in an opposite side of the multiplexers 130.

Figure 1B:
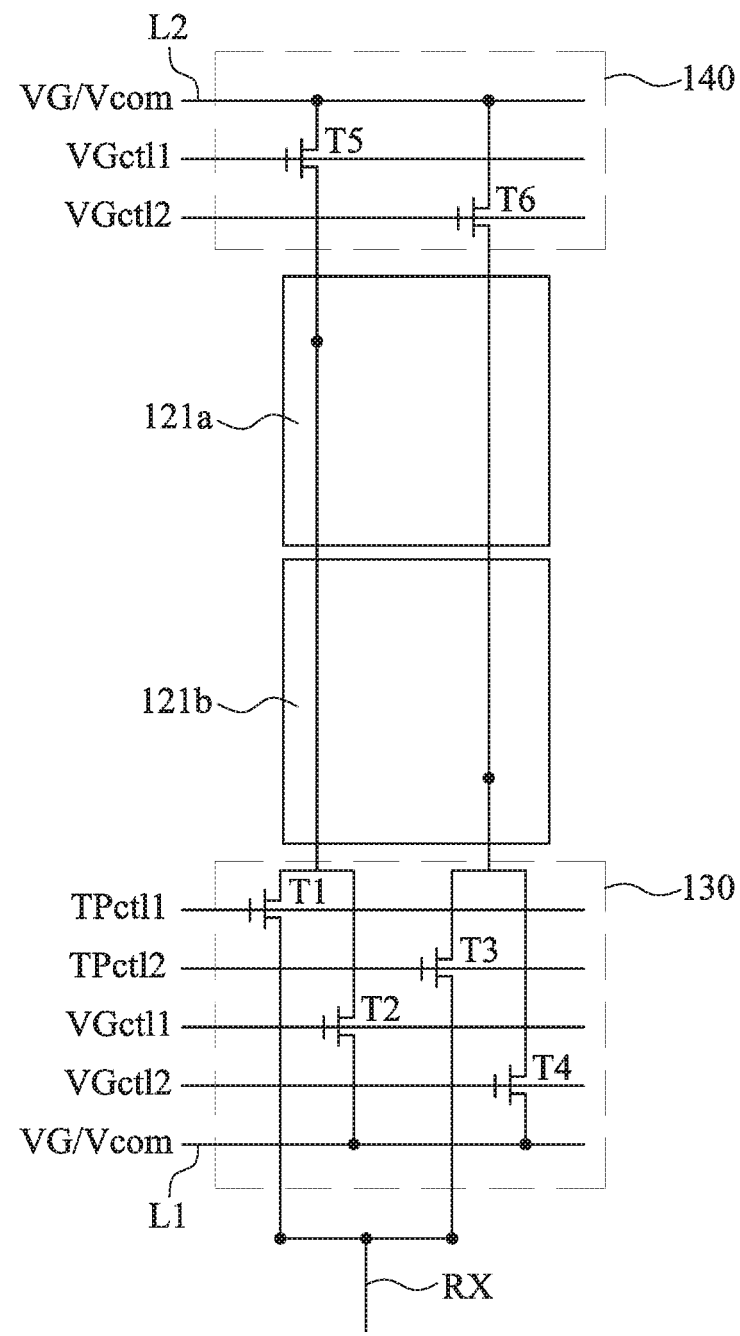
FIG. 1B is a partially enlarged schematic diagram illustrating the touch display panel according to a first embodiment of this disclosure.
Figure 10:
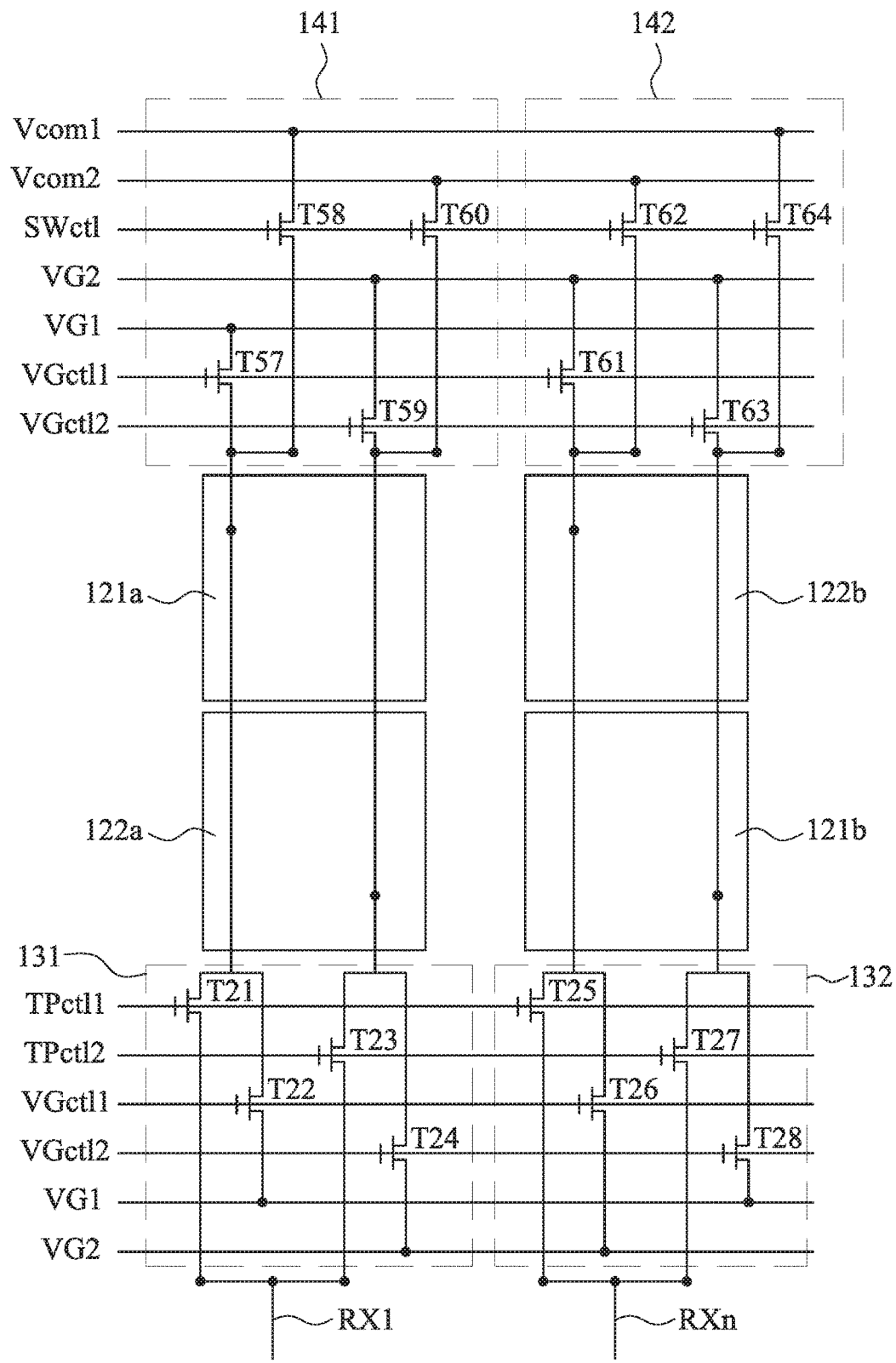
FIG. 10 is a partially enlarged schematic diagram illustrating the touch display panel according to a tenth embodiment of this disclosure.

Reference is made to FIG. 1B and FIG. 10. FIG. 1B is a partially enlarged schematic diagram illustrating the touch display panel according to a first embodiment of this disclosure and FIG. 10 is a timing diagram illustrating the driving signal of the touch display panel according to a first embodiment of this disclosure. With respect to the two first electrodes 121a and 121b, one multiplexer 130, and one set of switch circuit 140 and their associated driving signals as an example, the multiplexer 130 includes switches T1, T2, T3 and T4. The first node of the switch T1 is electrically connected to the first electrode 121a. The second node of the switch T1 is configured to receive the touch sensing signal RX, and the control node of the switch T1 is configured to receive the first touch control signal TPctl1. The first node of the switch T2 is electrically connected to the first node of the switch T1. The second node of the switch T2 is configured to receive the guarding signal VG, and the control node of the switch T2 is configured to receive the first guarding control signal VGctl1. The first node of the switch T3 is electrically connected to the first electrode 121b. The second node of the switch T3 is configured to receive the touch sensing signal RX, and the control node of the switch T3 is configured to receive the second touch control signal TPctl2. The first node of the switch T4 is electrically connected to the first node of the switch T3. The second node of the switch T4 is configured to receive the guarding signal VG, and the control node of the switch T4 is configured to receive the second guarding control signal VGctl2.

Afterwards, the switch circuit 140 includes switches T5 and T6. The first node of the switch T5 is configured to receive the guarding signal VG. The second node of the switch T5 is electrically connected to the first electrode 121a, and the control node of the switch T1 is configured to receive the first guarding control signal VGctl1. The first node of the switch T6 is configured to receive the guarding signal VG. The second node of the switch T6 is electrically connected to the first electrode 121b, and the control node of the switch T6 is configured to receive the second guarding control signal VGctl2.

Afterwards, in the embodiment, as shown in FIG. 10, in the display stage TP1, the first touch control signal TPctl1 and the second touch control signal TPctl2 switch to a disable level, and then the switch T1 and the switch T3 are turned off. The first guarding control signal VGctl1 and the second guarding control signal VGctl2 switch to an enable level, the switch T2, the switch T4, the switch T5, and the switch T6 are turned on, and then the first electrodes 121a and 121b are configured to receive a common signal Vcom. The waveform of the guarding signal VG is same as the waveform of the touch sensing signal RX, and the touch circuit 110 is configured to transmit the guarding signal VG or the common signal Vcom to the first electrodes 121a and 121b via the wire L1 and L2.

Afterwards, as shown in FIG. 10, the touch sensing stage TP2 includes a plurality of touch sub-stages TP21 and TP22. In the touch sub-stage TP21, the first touch control signal TPctl1 and the second guarding control signal VGctl2 switch to the enable level and the second touch control signal TPctl2 and the first guarding control signal VGctl1 switch to a disable level so that the switch T1, the switch T4 and the switch T6 are turned on, and then the first electrode 121a is configured to receive the touch sensing signal RX and the first electrode 121b is configured to receive the guarding signal VG. In the touch sub-stage TP22, the second touch control signal TPctl2 and the first guarding control signal VGctl1 switch to the enable level and the first touch control signal TPctl1 and the second guarding control signal VGctl2 switch to the disable level so that the switch T2, the switch T3 and the switch T5 are turned on, and then the first electrode 121b is configured to receive the touch sensing signal RX and the first electrode 121a is configured to receive the guarding signal VG. It is noticed that, when the first guarding control signal VGctl1 switches to the enable level in the touch sub-stage TP22, the first guarding control signal VGctl1 remains at the enable level until the next touch sensing stage TP2. In the touch sub-stage TP21, the second guarding control signal VGctl2 switches to the enable level, and then the second guarding control signal VGctl2 switches to the disable level in the touch sub-stage TP22. After the touch sub-stage TP22, the second guarding control signal VGctl2 switches to the enable level, and remains at the enable level until the next touch sensing stage TP2.

Afterwards, it is noticed that, the touch circuit 110 is configured to transmit the guarding signal VG or the common signal Vcom to the multiplexers 130 and the switch circuit 140 via the wire L1 and L2. The switch circuit 140 is configured to output the guarding signal VG to the first electrodes 121a and 121b. Therefore, the switch circuit 140 is capable of reducing the charging time of the touch electrode and decreasing the resistance and capacitance loading (RC loading).

Figure 2A:
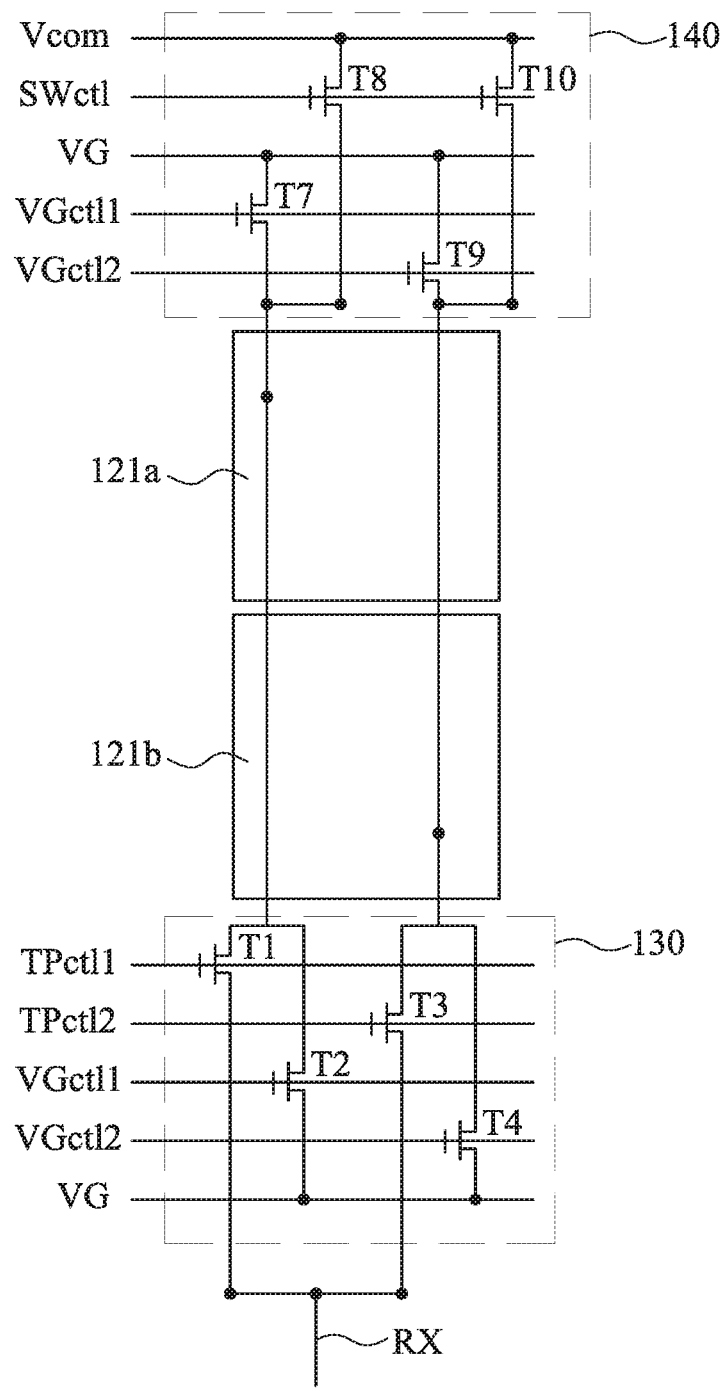
FIG. 2A is a partially enlarged schematic diagram illustrating the touch display panel according to a second embodiment of this disclosure.
Figure 2B:
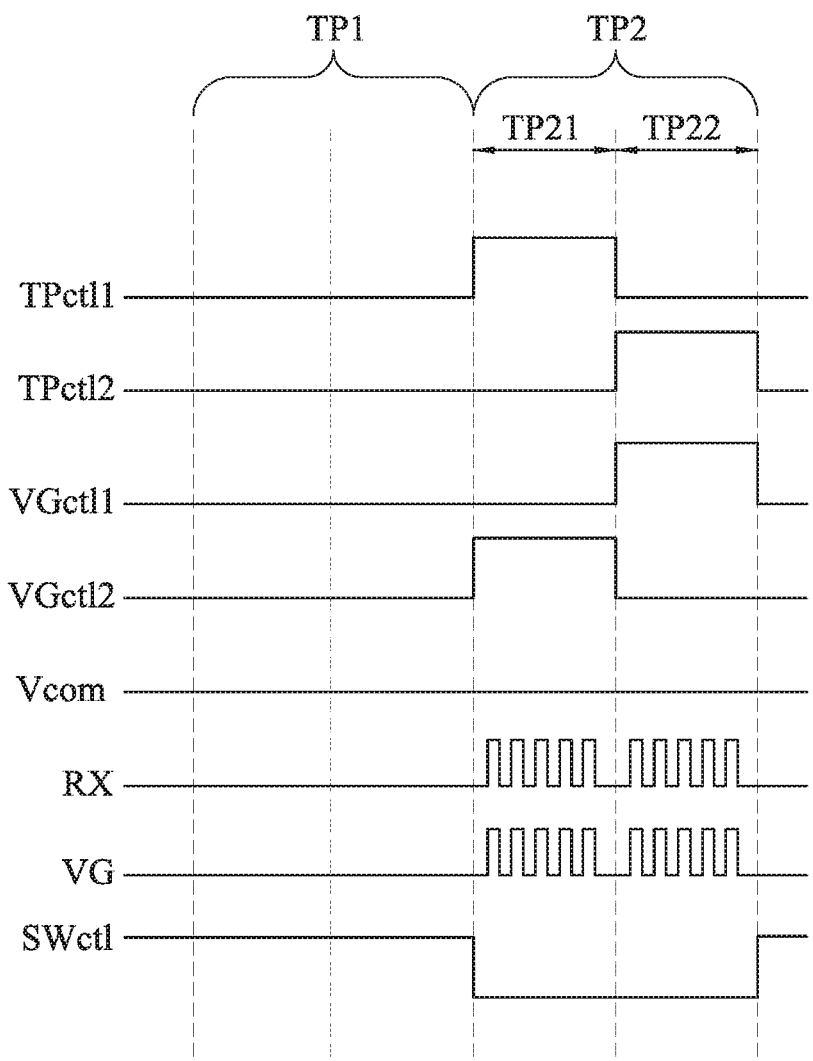
FIG. 2B is a timing diagram illustrating the driving signal of the touch display panel according to a second embodiment of this disclosure.

Reference is made to FIG. 2A and FIG. 2B. FIG. 2A is a partially enlarged schematic diagram illustrating the touch display panel according to a second embodiment of this disclosure and FIG. 2B is a timing diagram illustrating the driving signal of the touch display panel according to a second embodiment of this disclosure. The difference between the second embodiment and the first embodiment (as shown in FIG. 1B) is that the switch circuit 140 of the second embodiment is different from the switch circuit 140 of the first embodiment. As shown in FIG. 2A, with respect to the two first electrodes 121a and 121b, one multiplexer 130, and one set of switch circuit 140 and their associated driving signals as an example, the multiplexer 130 includes switches T7, T8, T9 and T10. The first node of the switch T7 is configured to receive the guarding signal VG. The second node of the switch T7 is electrically connected to the first electrode 121a, and the control node of the switch T7 is configured to receive the first guarding control signal VGctl1. The first node of the switch T8 is configured to receive the common signal Vcom. The second node of the switch T8 is electrically connected to the second node of the switch T7, and the control node of the switch T8 is configured to receive a switching control signal SWctl. The first node of the switch T9 is configured to receive the guarding signal VG. The second node of the switch T9 is electrically connected to the first electrode 121b, and the control node of the switch T9 is configured to receive the second guarding control signal VGctl2. The first node of the switch T10 is configured to receive the common signal Vcom. The second node of the switch T10 is electrically connected to the second node of the switch T9, and the control node of the switch T10 is configured to receive the switching control signal SWctl.

Afterwards, in the embodiment, as shown in FIG. 2B, in the display stage TP1, the first touch control signal TPctl1 and the second touch control signal TPctl2 switch to the disable level, and then the switch T1 and the switch T3 are turned off. The first guarding control signal VGctl1 and the second guarding control signal VGctl2 switch to the disable level and the switch T2, the switch T4, the switch T7, and the switch T9 are turned off. The switching control signal SWctl switches to the enable level and the switch T8 and the switch T10 are turned on, and then the first electrodes 121a and 121b are configured to receive the common signal Vcom.

Figure 1C:
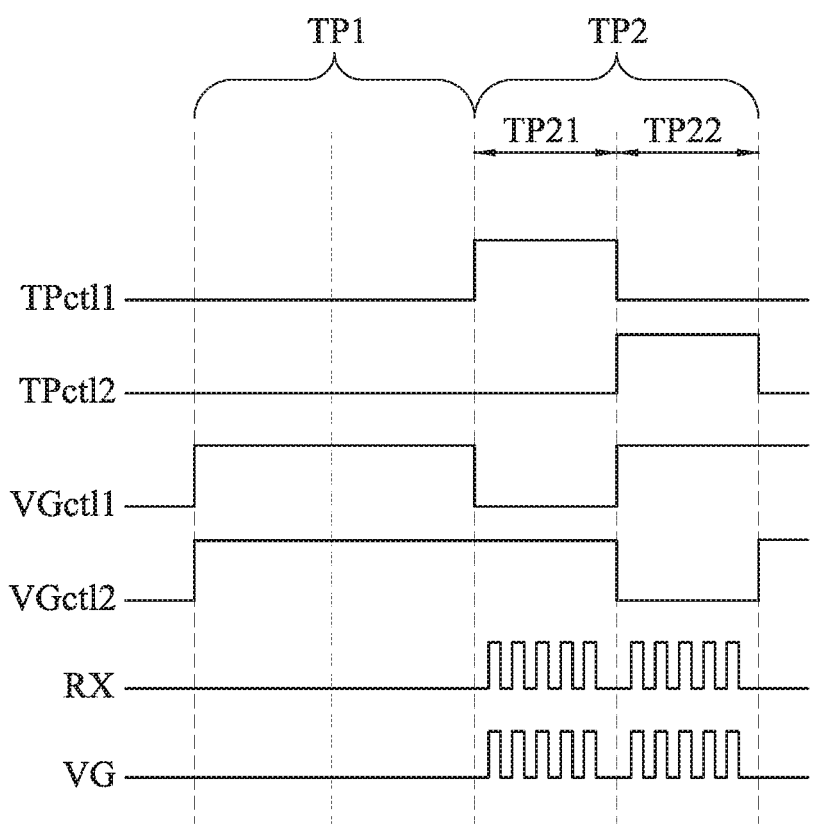
FIG. 1C is a timing diagram illustrating the driving signal of the touch display panel according to a first embodiment of this disclosure.

Afterwards, as shown in FIG. 2B, the touch sensing stage TP2 includes a plurality of touch sub-stages TP21 and TP22. In the touch sensing stage TP2, the operation of the first touch control signal TPctl1, the second touch control signal TPctl2, the first guarding control signal VGctl1 and the second guarding control signal VGctl2 are similar with the operation as shown in FIG. 1C. For the sake of brevity, those descriptions will not be repeated here. It is noticed that, the switching control signal SWctl remains at the disable level, and then the switch circuit 140 is configured to output the guarding signal VG to the first electrodes 121a and 121b. Therefore, the switch circuit 140 is capable of reducing the charging time of the touch electrode and decreasing the resistance and capacitance loading (RC loading).

Figure 3A:
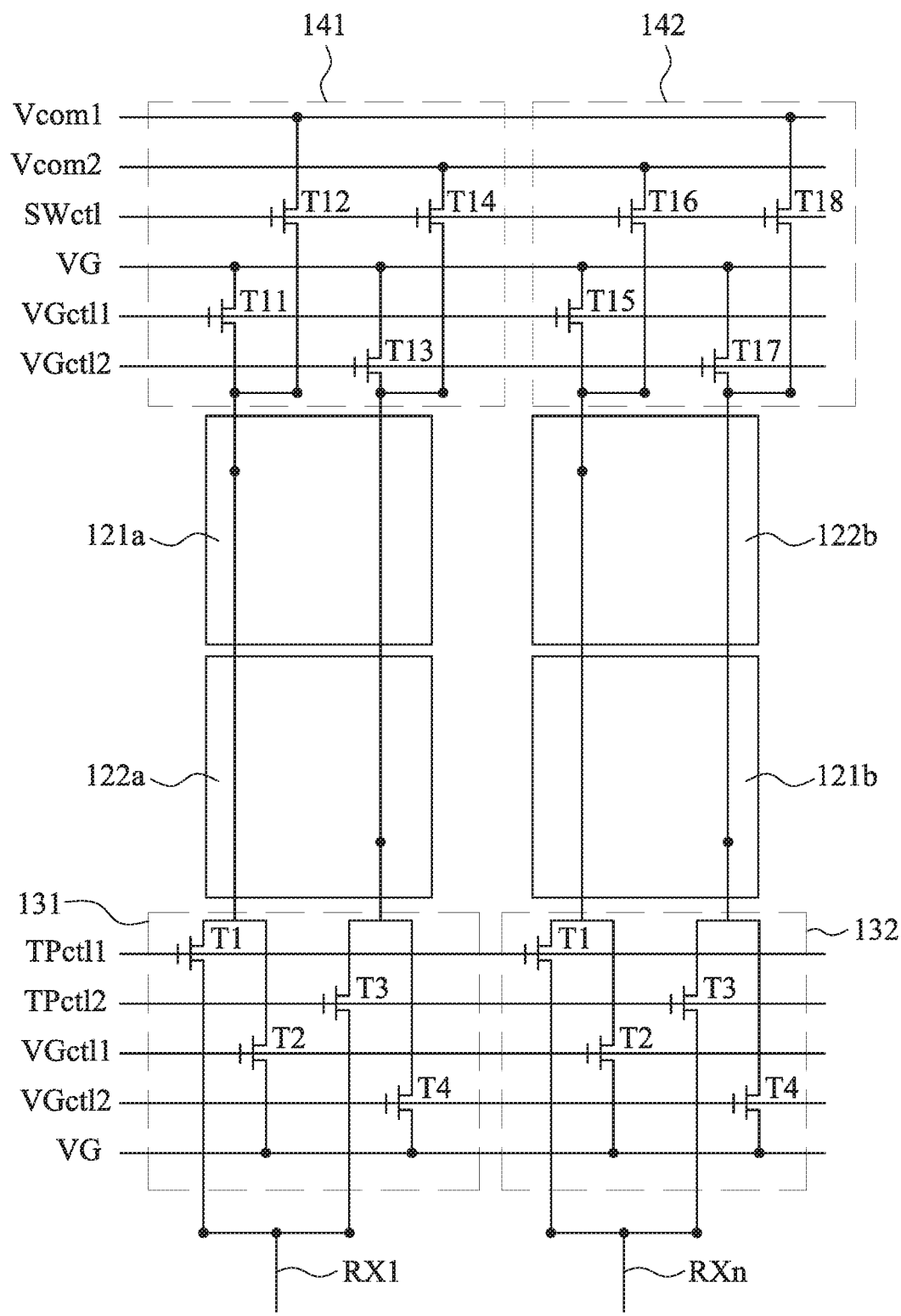
FIG. 3A is a partially enlarged schematic diagram illustrating the touch display panel according to a third embodiment of this disclosure.
Figure 3B:
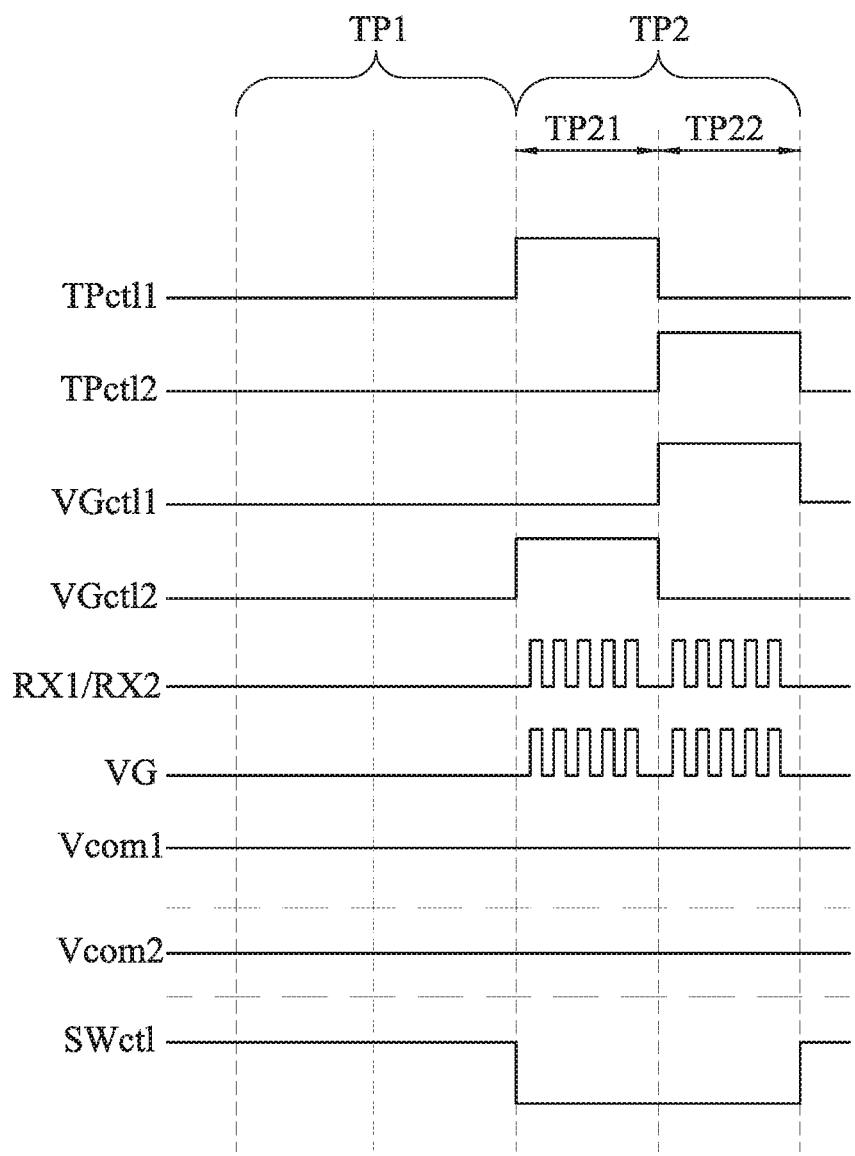
FIG. 3B is a timing diagram illustrating the driving signal of the touch display panel according to a third embodiment of this disclosure.

Reference is made to FIG. 3A and FIG. 3B. FIG. 3A is a partially enlarged schematic diagram illustrating the touch display panel according to a third embodiment of this disclosure and FIG. 3B is a timing diagram illustrating the driving signal of the touch display panel according to a third embodiment of this disclosure. The difference between the third embodiment and the second embodiment (as shown in FIG. 2A) is that the switch circuit 140 of the third embodiment is different from the switch circuit 140 of the second embodiment. In this embodiment, the touch electrode layer 120 further includes a plurality of second electrodes 122a and 122b. The second electrodes 122a and 122b and the first electrodes 121a and 121b are staggeredly arranged along a first direction D1 and a second direction D2. As shown in FIG. 3A, with respect to two first electrodes 121a and 121b, two second electrodes 122a and 122b, two multiplexers 131 and 132, and two sets of switch circuit 141 and 142 and their associated driving signals as an example. It is noticed that, in the disclosure also can use three multiplexers and three sets of switch circuits. However, the disclosure is not limited thereto.

Afterwards, the switch circuit 141 includes switches T11, T12, T13 and T14. The first node of the switch T11 is configured to receive the guarding signal VG. The second node of the switch T11 is electrically connected to the first electrode 121a, and the control node of the switch T11 is configured to receive the first guarding control signal VGctl1. The first node of the switch T12 is configured to receive the first common signal Vcom1. The second node of the switch T12 is electrically connected to the second node of the switch T11, and the control node of the switch T12 is configured to receive a switching control signal SWctl. The first node of the switch T13 is configured to receive the guarding signal VG. The second node of the switch T13 is electrically connected to the second electrode 122b, and the control node of the switch T13 is configured to receive the second guarding control signal VGctl2. The first node of the switch T14 is configured to receive the second common signal Vcom2. The second node of the switch T14 is electrically connected to the second node of the switch T13, and the control node of the switch T14 is configured to receive the switching control signal SWctl.

Afterwards, the switch circuit 142 includes switches T15, T16, T17 and T18. The first node of the switch T15 is configured to receive the guarding signal VG. The second node of the switch T15 is electrically connected to the second electrode 122b, and the control node of the switch T15 is configured to receive the first guarding control signal VGctl1. The first node of the switch T16 is configured to receive the second common signal Vcom2. The second node of the switch T16 is electrically connected to the second node of the switch T15, and the control node of the switch T16 is configured to receive a switching control signal SWctl. The first node of the switch T17 is configured to receive the guarding signal VG. The second node of the switch T17 is electrically connected to the first electrode 121b, and the control node of the switch T17 is configured to receive the second guarding control signal VGctl2. The first node of the switch T18 is configured to receive the first common signal Vcom1. The second node of the switch T18 is electrically connected to the second node of the switch T17, and the control node of the switch T18 is configured to receive the switching control signal SWctl.

Afterwards, in the embodiment, as shown in FIG. 3B, in the display stage TP1, the first touch control signal TPctl1 and the second touch control signal TPctl2 switch to the disable level, and then the switch T1 and the switch T3 are turned off. The first guarding control signal VGctl1 and the second guarding control signal VGctl2 switch to the disable level so that the switch T2, the switch T4, the switch T11, the switch T13, the switch T15 and the switch T17 are turned off. The switching control signal SWctl switches to the enable level so that the switch T12, the switch T14, the switch T16 and the switch T18 are turned on, and then the first electrodes 121a and 121b are configured to receive the first common signal Vcom1 and the second electrodes 122a and 122b are configured to receive the second common signal Vcom2.

Afterwards, in the embodiment, as shown in FIG. 3B, the touch sensing stage TP2 includes a plurality of touch sub-stages TP21 and TP22. In the touch sub-stage TP21, the first touch control signal TPctl1 and the second guarding control signal VGctl2 switch to the enable level so that the switch T1, the switch T4, the switch T13 and the switch T17 are turned on, and then the first electrode 121a is configured to receive the touch sensing signal RX1; the second electrode 122*b* is configured to receive the touch sensing signal RXn and the second electrode 122*a* and the first electrode 121*b* is configured to receive the guarding signal VG. Similarly, in the touch sub-stage TP22, the second touch control signal TPctl2 and the first guarding control signal VGctl1 switch to the enable level so that the switch T2, the switch T3, the switch T11 and the switch T15 are turned on, and then the second electrode 122*a* is configured to receive the touch sensing signal RX1; the first electrode 121*b* is configured to receive the touch sensing signal RXn and the first electrode 121*a* and the second electrode 122*b* is configured to receive the guarding signal VG. It is noticed that, in the touch sensing stage TP2, the switching control signal SWctl switches to the disable level, and then the touch circuit 110 is configured to output the guarding signal VG to the first electrode 121*a* and 121*b* and the second electrode 122*a* and 122*b*. Therefore, the switch circuit 140 is capable of reducing the charging time of the touch electrode and decreasing the resistance and capacitance loading (RC loading).

Afterwards, in the embodiment, because the switch circuit 141 and 142 are electrically connected to the first common signal Vcom1 and the second common signal Vcom2, respectively, the first common signal Vcom1 and the second common signal Vcom2 can be utilized to input opposite voltage polarities to test whether the first electrode 121 and the second electrode 122 are short circuited with each other in the testing stage of the touch display panel. In the display stage, because the switch circuit 141 and 142 are electrically connected to the first common signal Vcom1 and the second common signal Vcom2, respectively, the touch display panel may be driven by using the dot inversion method. That is, the first common signal Vcom1 and the second common signal Vcom2 have opposite voltage polarities.

Figure 4A:
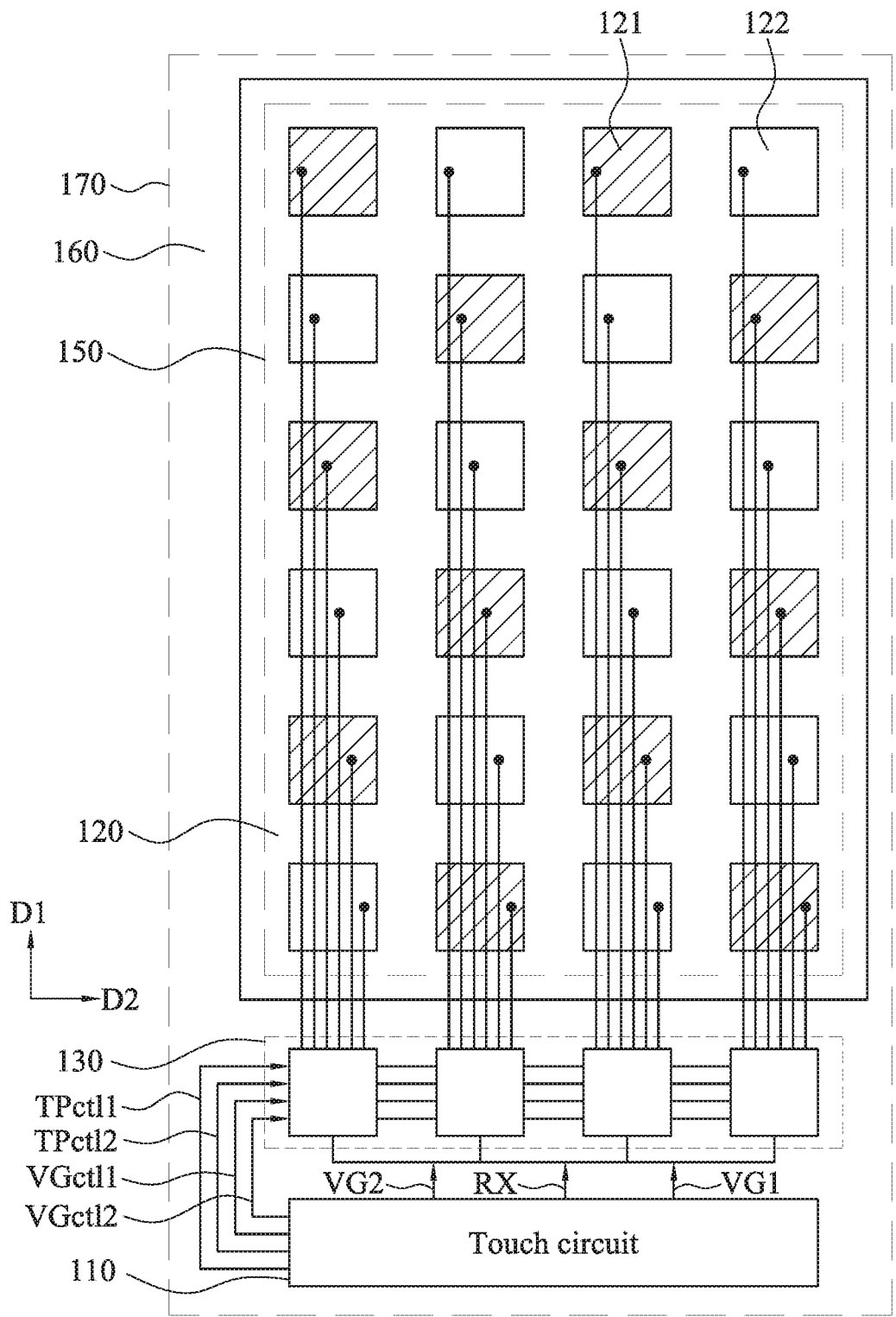
FIG. 4A is a functional block diagram of a touch display panel according to a fourth embodiment of the present disclosure.

Reference is made to FIG. 4A, which is a functional block diagram of a touch display panel 400 according to a fourth embodiment of the present disclosure. As shown in FIG. 4A, the touch display panel 400 includes a touch circuit 110, a touch electrode layer 120 and a plurality of multiplexers 130. The touch electrode layer 120 includes a plurality of first electrodes 121 and a plurality of second electrodes 122. The first electrodes 121 and the second electrodes 122 are staggeredly arranged along a first direction D1 and a second direction D2. The multiplexers 130 are electrically coupled to the touch circuit 110, one of the first electrodes 121 and one of the second electrodes 122. The touch circuit 110 is configured to output a first guarding control signal VGctl1, a second guarding control signal VGctl2, a first touch control signal TPctl1, a second touch control signal TPctl2, a touch sensing signal RX, a first guarding signal VG1 and a second guarding signal VG2. The multiplexers 130 are configured to output the first guarding signal VG1 and the second guarding signal VG2 to the first electrodes 121 and the second electrodes 122 according to the first guarding control signal VGctl1, the second guarding control signal VGctl2, the first touch control signal TPctl1, and the second touch control signal TPctl2.

Figure 4B:
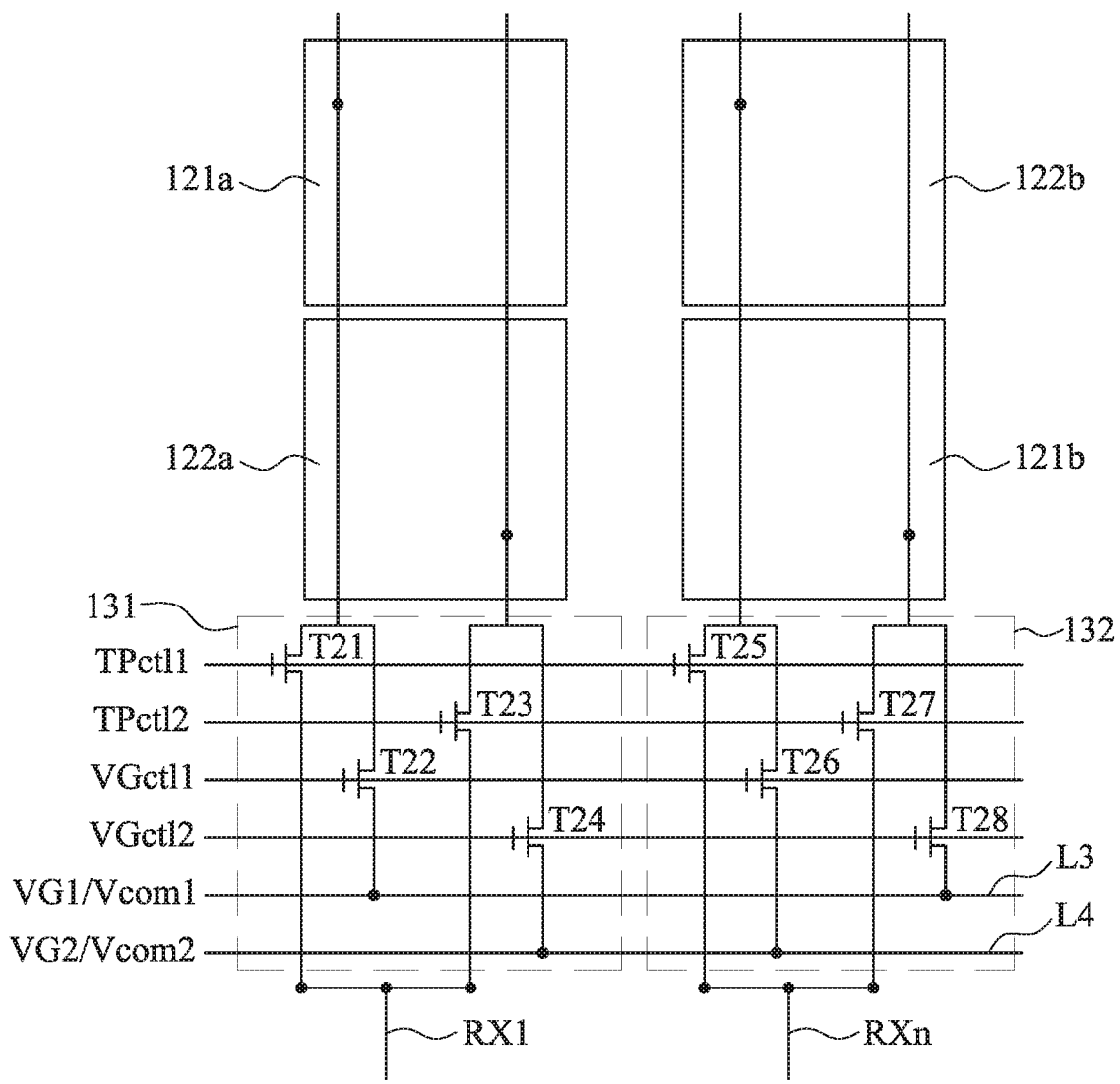
FIG. 4B is a partially enlarged schematic diagram illustrating the touch display panel according to a fourth embodiment of this disclosure.

Reference is made to FIG. 4B, which is a partially enlarged schematic diagram illustrating the touch display panel according to a fourth embodiment of this disclosure. As shown in FIG. 4B, with respect to the two first electrodes 121*a* and 121*b*, the two second electrodes 122*a* and 122*b* and the two multiplexer 131 and 132 and their associated driving signals as an example, the multiplexer 131 includes switches T21, T22, T23 and T24. The first node of the switch T21 is electrically connected to the first electrode 121*a*. The second node of the switch T21 is configured to receive the touch sensing signal RX1, and the control node of the switch T21 is configured to receive the first touch control signal TPctl1. The first node of the switch T22 is electrically connected to the first node of the switch T21. The second node of the switch T22 is configured to receive the first guarding signal VG1, and the control node of the switch T22 is configured to receive the first guarding control signal VGctl1. The first node of the switch T23 is electrically connected to the second electrode 122*a*. The second node of the switch T23 is configured to receive the touch sensing signal RX1, and the control node of the switch T23 is configured to receive the second touch control signal TPctl2. The first node of the switch T24 is electrically connected to the first node of the switch T23. The second node of the switch T24 is configured to receive the second guarding signal VG2, and the control node of the switch T24 is configured to receive the second guarding control signal VGctl2.

Afterwards, the multiplexer 132 includes switches T25, T26, T27 and T28. The first node of the switch T25 is electrically connected to the second electrode 122*b*. The second node of the switch T25 is configured to receive the touch sensing signal RXn, and the control node of the switch T25 is configured to receive the first touch control signal TPctl1. The first node of the switch T26 is electrically connected to the first node of the switch T25. The second node of the switch T26 is configured to receive the second guarding signal VG2, and the control node of the switch T26 is configured to receive the first guarding control signal VGctl1. The first node of the switch T27 is electrically connected to the first electrode 121*b*. The second node of the switch T27 is configured to receive the touch sensing signal RXn, and the control node of the switch T27 is configured to receive the second touch control signal TPctl2. The first node of the switch T28 is electrically connected to the first node of the switch T27. The second node of the switch T28 is configured to receive the first guarding signal VG1, and the control node of the switch T28 is configured to receive the second guarding control signal VGctl2.

Afterwards, in the embodiment, the timing of the fourth embodiment is similar with the timing of the first embodiment. The difference is that in the touch sub-stage TP21, when the first touch control signal TPctl1 and the second guarding control signal VGctl2 switch to the enable level, the switch T21 and the switch T24 are turned on, and then the first electrode 121*a* is configured to receive the touch sensing signal RX1 and the second electrode 122*a* is configured to receive the second guarding signal VG2. In the touch sub-stage TP22, when the second touch control signal TPctl2 and the first guarding control signal VGctl1 switch to the enable level, the switch T22 and the switch T23 are turned on, and then the second electrode 122*a* is configured to receive the touch sensing signal RX1 and the first electrode 121*a* is configured to receive the first guarding signal VG1. It is noticed that, in the display stage TP1, the touch circuit 110 is configured to transmit the first guarding signal VG1 and the first common signal Vcom1 via the wire L3 and transmit the second guarding signal VG2 and the second common signal Vcom2 via the wire L4 to the first electrode 121*a* and 121*b* and the second electrode 122*a* and 122*b*.

Figure 5A:
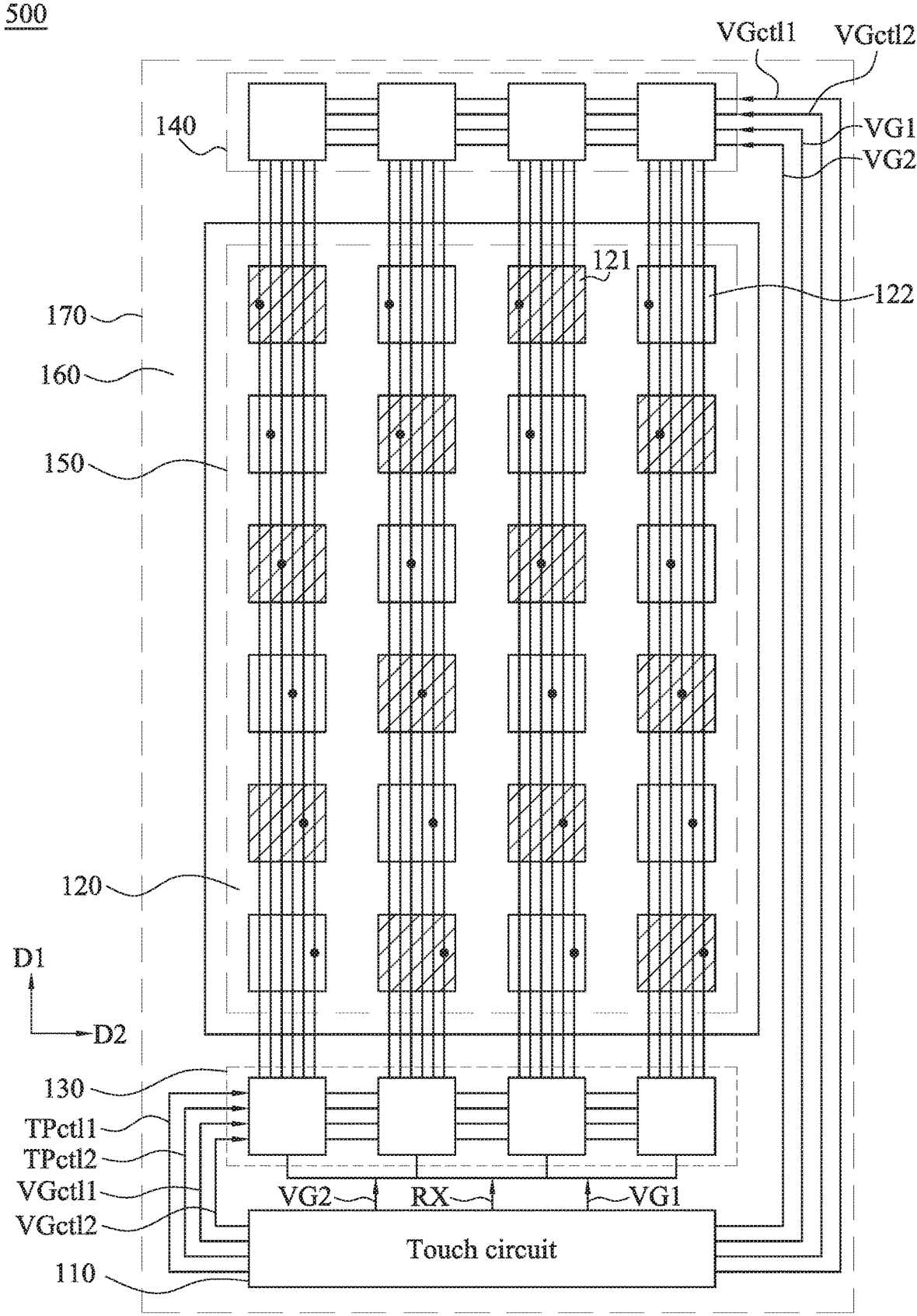
FIG. 5A is a functional block diagram of a touch display panel according to a fifth embodiment of the present disclosure.

Reference is made to FIG. 5A, which is a functional block diagram of a touch display panel 500 according to a fifth embodiment of the present disclosure. As shown in FIG. 5A, the touch display panel 500 includes a touch circuit 110, a touch electrode layer 120 a plurality of multiplexers 130 and the switch circuit 140. The difference between the fifth embodiment and the fourth embodiment (as shown in FIG.

4A) is that the touch display panel 500 of the fifth embodiment further includes the switch circuit 140. The switch circuit 140 is disposed in an opposite side of the multiplexers 131 and 132. The switch circuit 140 is configured to receive the first guarding control signal VGctl1, the second guarding control signal VGctl2, the first guarding signal VG1 and the second guarding signal VG2 outputted by the touch circuit 110. The switch circuit 140 is configured to output the first guarding signal VG1 and the second guarding signal VG2 to the first electrode 121 and the second electrode 122 according to the first guarding control signal VGctl1 and the second guarding control signal VGctl2.

Figure 5B:
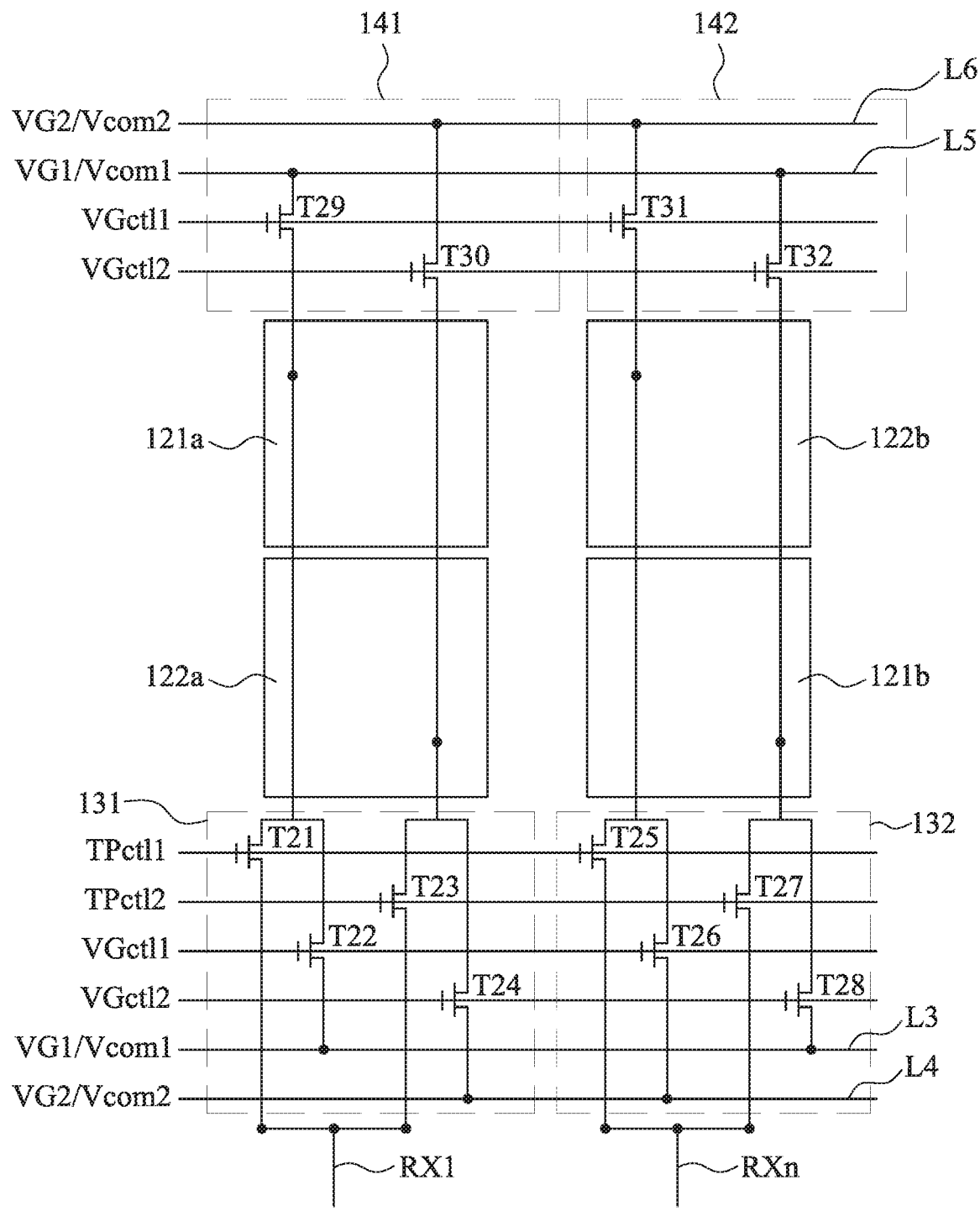
FIG. 5B is a partially enlarged schematic diagram illustrating the touch display panel according to a fifth embodiment of this disclosure.

Reference is made to FIG. 5B, which is a partially enlarged schematic diagram illustrating the touch display panel according to a fifth embodiment of this disclosure. As shown in FIG. 5B, with respect to the two first electrodes 121a and 121b, the two second electrodes 122a and 122b and the two multiplexer 131 and 132 and their associated driving signals as an example, the switch circuit 141 includes switches T29 and T30. The first node of the switch T29 is configured to receive the first guarding signal VG1. The second node of the switch T29 is electrically connected to the first electrode 121a and the control node of the switch T29 is configured to receive the first guarding control signal VGctl1. The first node of the switch T30 is configured to receive the second guarding signal VG2. The second node of the switch T30 is electrically connected to the second electrode 122a and the control node of the switch T30 is configured to receive the second guarding control signal VGctl2. The switch circuit 142 includes switches T31 and T32. The first node of the switch T31 is configured to receive the second guarding signal VG2. The second node of the switch T31 is electrically connected to the second electrode 122b and the control node of the switch T31 is configured to receive the first guarding control signal VGctl1. The first node of the switch T32 is configured to receive the first guarding signal VG1. The second node of the switch T32 is electrically connected to the first electrode 121b and the control node of the switch T32 is configured to receive the second guarding control signal VGctl2.

Afterwards, in the embodiment, it is noticed that, the switch circuit 140 is configured to receive the first guarding control signal VGctl1 and the second guarding control signal VGctl2. That is, the operation of the switch circuit 140 is similar with the operation of the switch circuit 140 of the third embodiment. When the second guarding control signal VGctl2 switches to the enable level, the switch T24, the switch T28, the switch T30 and the switch T32 are turned on. That is, the switch circuit 141 and the multiplexer 131 are configured to output the second guarding signal VG2 to the second electrode 122a, and the switch circuit 142 and the multiplexer 132 are configured to output the first guarding signal VG1 to the first electrode 121b. When the first guarding control signal VGctl1 switch to the enable level, the switch T22, the switch T26, the switch T29 and the switch T31 are turned on. That is, the switch circuit 141 and the multiplexer 131 are configured to output the first guarding signal VG1 to the first electrode 121a, and the switch circuit 142 and the multiplexer 132 are configured to output the second guarding signal VG2 to the second electrode 122b. It is noticed that, in the display stage TP1, the touch circuit 110 is configured to transmit the first guarding signal VG1 and the first common signal Vcom1 via the wires L3 and L5, and transmit the second guarding signal VG2 and the second common signal Vcom2 via the wires L4 and L6 to the first electrode 121a and 121b and the second electrode 122a and 122b. Therefore, the switch circuit 140 is capable of reducing the charging time of the touch electrode and decreasing the resistance and capacitance loading (RC loading).

Figure 6A:
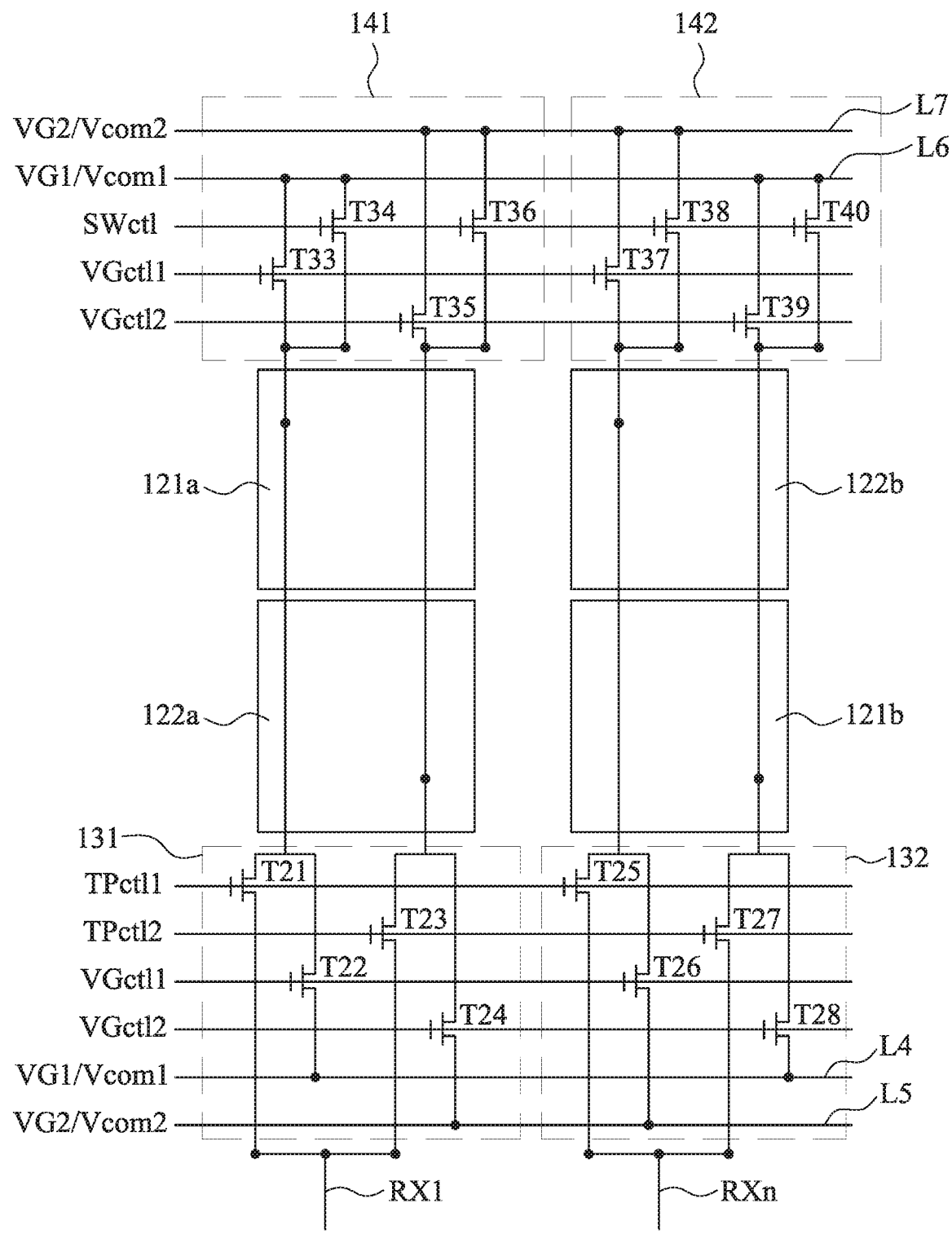
FIG. 6A is a partially enlarged schematic diagram illustrating the touch display panel according to a sixth embodiment of this disclosure.
Figure 6B:
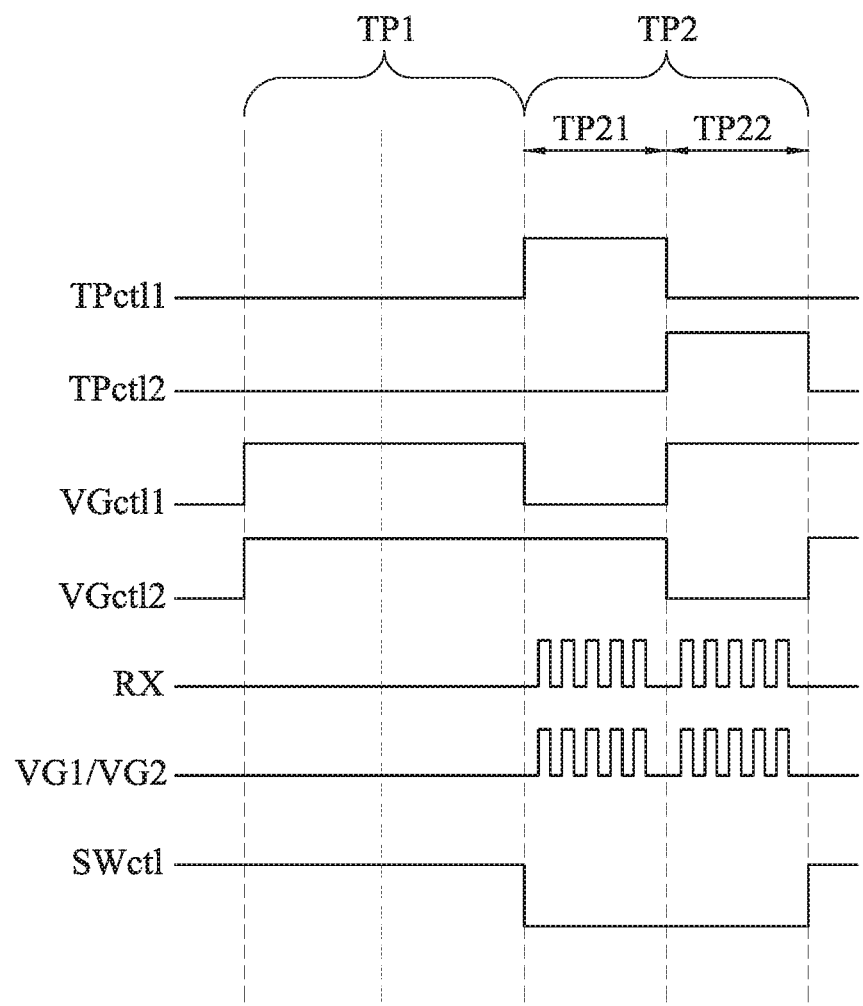
FIG. 6B is a timing diagram illustrating the driving signal of the touch display panel according to a sixth embodiment of this disclosure.

Reference is made to FIG. 6A and FIG. 6B. FIG. 6A is a partially enlarged schematic diagram illustrating the touch display panel according to a sixth embodiment of this disclosure and FIG. 6B is a timing diagram illustrating the driving signal of the touch display panel according to a sixth embodiment of this disclosure. As shown in FIG. 6A, with respect to the two first electrodes 121a and 121b, the two second electrodes 122a and 122b, the two multiplexer 131 and 132, and a set of switch circuit 140 and their associated driving signals as an example. The difference between the sixth embodiment and the fifth embodiment is that the switch circuit 140 is configured to output the first guarding signal VG1 and the second guarding signal VG2 to the first electrodes 121 and the second electrodes 122 according to the first guarding control signal VGctl1, the second guarding control signal VGctl2 and the switching control signal SWctl.

Afterwards, in the embodiment, the switch circuit 141 includes the switch T33, the switch T34, the switch T35 and the switch T36. The first node of the switch T33 is configured to receive the first guarding signal VG1. The second node of the switch T33 is electrically connected to the first electrode 121a and the control node of the switch T33 is configured to receive the first guarding control signal VGctl1. The first node of the switch T34 is configured to receive the first guarding signal VG1. The second node of the switch T34 is electrically connected to the second node of the switch T33 and the control node of the switch T34 is configured to receive the switching control signal SWctl. The first node of the switch T35 is configured to receive the second guarding signal VG2. The second node of the switch T35 is electrically connected to the second electrode 122a and the control node of the switch T35 is configured to receive the second guarding control signal VGctl2. The first node of the switch T36 is configured to receive the second guarding signal VG2. The second node of the switch T36 is electrically connected to the second node of the switch T35 and the control node of the switch T36 is configured to receive the switching control signal SWctl.

Afterwards, in the embodiment, the switch circuit 142 includes the switch T73, the switch T38, the switch T39 and the switch T40. The first node of the switch T37 is configured to receive the second guarding signal VG2. The second node of the switch T37 is electrically connected to the second electrode 122b and the control node of the switch T37 is configured to receive the first guarding control signal VGctl1. The first node of the switch T38 is configured to receive the second guarding signal VG2. The second node of the switch T38 is electrically connected to the second node of the switch T37 and the control node of the switch T38 is configured to receive the switching control signal SWctl. The first node of the switch T39 is configured to receive the first guarding signal VG1. The second node of the switch T39 is electrically connected to the first electrode 121b and the control node of the switch T39 is configured to receive the second guarding control signal VGctl2. The first node of the switch T40 is configured to receive the first guarding signal VG1. The second node of the switch T40 is electrically connected to the second node of the switch T39 and the control node of the switch T40 is configured to receive the switching control signal SWctl.

Afterwards, in the embodiment, as shown in FIG. 6B, in the display stage TP1, the first touch control signal TPctl1 and the second touch control signal TPctl2 switch to the disable level so that the switch T21, the switch T23, the switch T25, and the switch T27 are turned off. The switching control signal SWctl, the first guarding control signal VGctl1, and the second guarding control signal VGctl2 switch to the enable level so that the switch T22, the switch T24, the switch T26, the switch T28 and the switches T33-T40 are turned on. That is, the first electrode 121a and 121b are configured to receive the first guarding signal VG1, and the second electrode 122a and 122b are configured to receive the second guarding signal VG2.

Afterwards, in the embodiment, as shown in FIG. 6B, the touch sensing stage TP2 includes a plurality of touch sub-stages TP21 and TP22. In the operation of the touch sub-stage TP21, the first touch control signal TPctl1 and the second guarding control signal VGctl2 switch to the enable level so that the switch T21, the switch T24, the switch T25, the switch T28, the switch T35 and the switch T39 are turned on, and then the first electrode 121a is configured to receive the touch sensing signal RX1; the second electrode 122b is configured to receive the touch sensing signal RXn; the second electrode 122a is configured to receive the second guarding signal VG2 and the first electrode 121b is configured to receive the first guarding signal VG1. The operation of the touch sub-stage TP22 is similar with the operation of the touch sub-stage TP21, the second touch control signal TPctl2 and the first guarding control signal VGctl1 switch to the enable level, for the sake of brevity, those descriptions will not be repeated here. It is noticed that, the waveform of the first guarding signal VG1 and the second guarding signal VG2 are similar with the waveform of the touch sensing signal RX.

Figure 7:
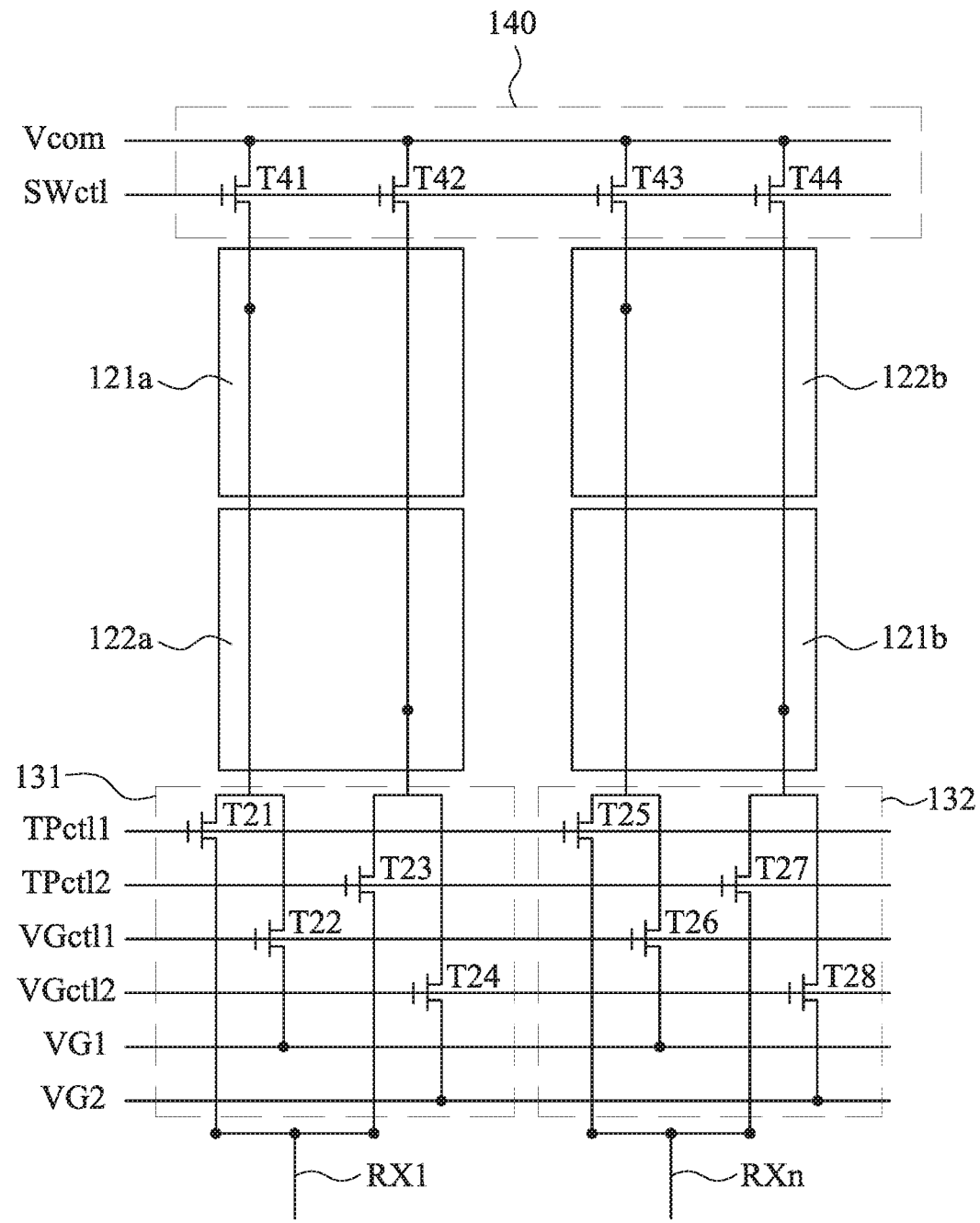
FIG. 7 is a partially enlarged schematic diagram illustrating the touch display panel according to a seventh embodiment of this disclosure.

Reference is made to FIG. 7, which is a partially enlarged schematic diagram illustrating the touch display panel according to a seventh embodiment of this disclosure. The seventh embodiment is similar with the fifth embodiment (as shown in FIG. 5B), and the difference is that the implementation of the switch circuit 140. The switch circuit 140 of the seventh embodiment is configured to receive the switching control signal SWctl and the common signal Vcom outputted by the touch circuit 110. The switch circuit 140 includes the switch T41, the switch T42, the switch T43 and the switch T44. The first node of the switch T41 is configured to receive the common signal Vcom. The second node of the switch T41 is electrically connected to the first electrode 121a and the control node of the switch T41 is configured to receive the switching control signal SWctl. The first node of the switch T42 is configured to receive the common signal Vcom. The second node of the switch T41 is electrically connected to the second electrode 122a and the control node of the switch T42 is configured to receive the switching control signal SWctl. The first node of the switch T43 is configured to receive the common signal Vcom. The second node of the switch T43 is electrically connected to the second electrode 122b and the control node of the switch T43 is configured to receive the switching control signal SWctl. The first node of the switch T44 is configured to receive the common signal Vcom. The second node of the switch T44 is electrically connected to the first electrode 121b and the control node of the switch T44 is configured to receive the switching control signal SWctl. In this embodiment, the operation of the switching control signal SWctl is similar with the operation as shown in FIG. 6B. In the display stage TP1, the switching control signal SWctl switches to the enable level so that the switches T41~T44 are turned on, and then the first electrodes 121a and 121b and the second electrodes 122a and 122b are configured to receive the common signal Vcom.

Figure 8:
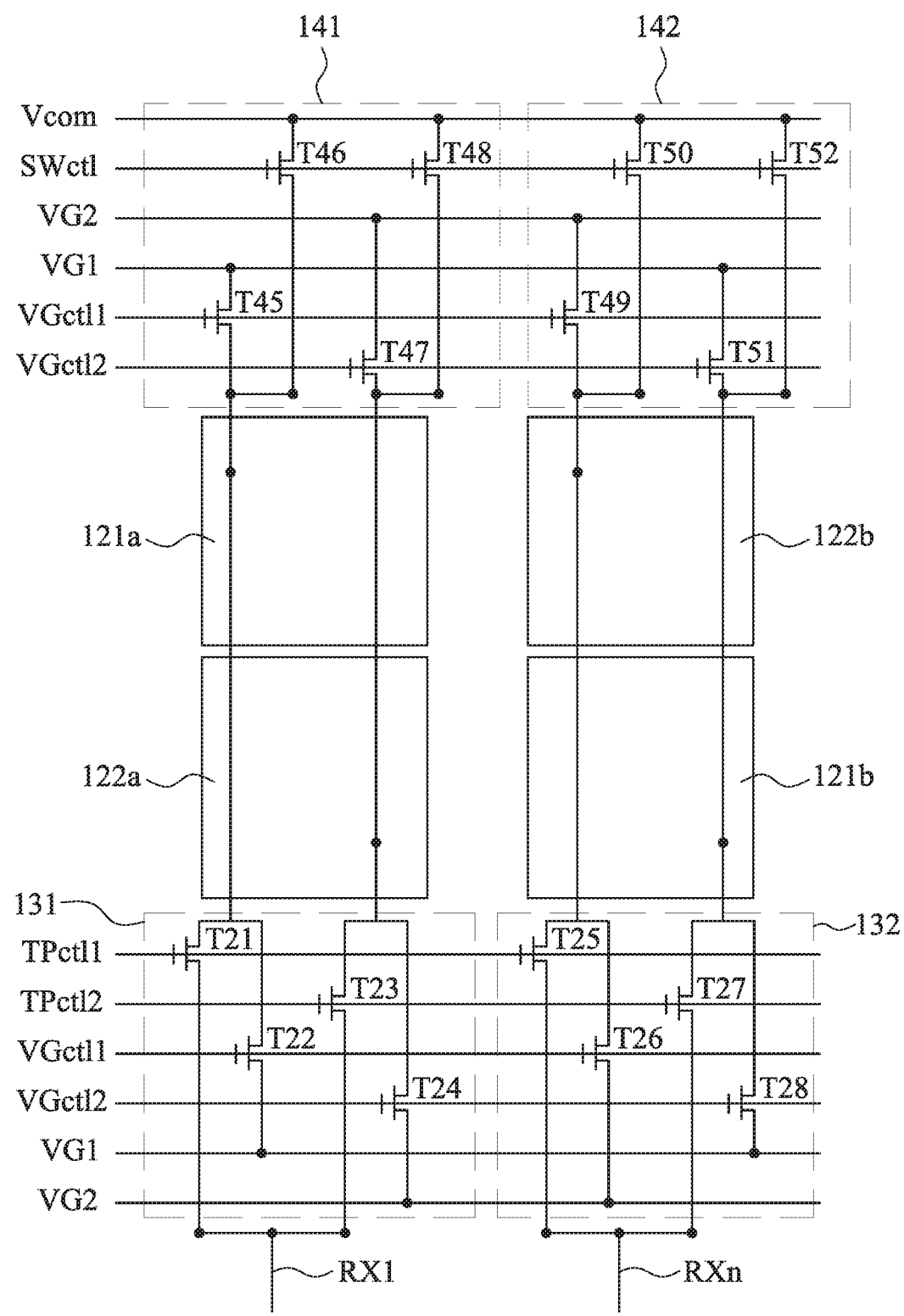
FIG. 8 is a partially enlarged schematic diagram illustrating the touch display panel according to an eighth embodiment of this disclosure.

Reference is made to FIG. 8, which is a partially enlarged schematic diagram illustrating the touch display panel according to an eighth embodiment of this disclosure. The eighth embodiment is similar with the fifth embodiment (as shown in FIG. 5B), and the difference is that the implementation of the switch circuit 140. The switch circuit 140 of the eighth embodiment is configured to receive the first guarding signal VG1, the second guarding signal VG2, the first guarding control signal VGctl1, the second guarding control signal VGctl2, the switching control signal SWctl and the common signal Vcom outputted by the touch circuit 110. The switch circuit 140 is configured to output the first guarding signal VG1, the second guarding signal VG2 and the common signal Vcom to the first electrode 121 and the second electrode 122 according to the first guarding control signal VGctl1 and the second guarding control signal VGctl2. The switch circuit 141 includes the switch T45, the switch T46, the switch T47 and the switch T48. The first node of the switch T45 is configured to receive the first guarding signal VG1. The second node of the switch T45 is electrically connected to the first electrode 121a and the control node of the switch T45 is configured to receive the first guarding control signal VGctl1. The first node of the switch T46 is configured to receive the common signal Vcom. The second node of the switch T46 is electrically connected to the second node of the switch T45 and the control node of the switch T46 is configured to receive the switching control signal SWctl. The first node of the switch T47 is configured to receive the second guarding signal VG2. The second node of the switch T45 is electrically connected to the second electrode 122a and the control node of the switch T47 is configured to receive the second guarding control signal VGctl2. The first node of the switch T48 is configured to receive the common signal Vcom. The second node of the switch T48 is electrically connected to the second node of the switch T47 and the control node of the switch T48 is configured to receive the switching control signal SWctl.

Afterwards, the switch circuit 142 includes the switch T49, the switch T50, the switch T51 and the switch T52. The first node of the switch T49 is configured to receive the second guarding signal VG2. The second node of the switch T45 is electrically connected to the second electrode 122b and the control node of the switch T49 is configured to receive the first guarding control signal VGctl1. The first node of the switch T50 is configured to receive the common signal Vcom. The second node of the switch T50 is electrically connected to the second node of the switch T49 and the control node of the switch T50 is configured to receive the switching control signal SWctl. The first node of the switch T51 is configured to receive the first guarding signal VG1. The second node of the switch T51 is electrically connected to the first electrode 121b and the control node of the switch T51 is configured to receive the second guarding control signal VGctl2. The first node of the switch T52 is configured to receive the common signal Vcom. The second node of the switch T52 is electrically connected to the second node of the switch T51 and the control node of the switch T52 is configured to receive the switching control signal SWctl.

Afterwards, in the embodiment, the operation of the first guarding control signal VGctl1, the second guarding control signal VGctl2 and the switching control signal SWctl are similar with the operation of the second embodiment (as shown in FIG. 2B). In the display stage TP1, the switching control signal SWctl switches to the enable level so that the switch T46, the switch T48, the switch T50, and the switch T52 are turned on, and then the first electrodes 121a and 121b and the second electrodes 122a and 122b are configured to receive the common signal Vcom. In the operation of the touch sensing stage TP2, the switching control signal SWctl switches to the disable level, and the first touch control signal TPctl1, the second guarding control signal VGctl2, the second touch control signal TPctl2, and the first guarding control signal VGctl1 sequentially switch to the enable level. That is, when the first electrodes 121a and the second electrodes 122b receive the touch sensing signal RX1 and the touch sensing signal RXn, the first guarding signal VG1 and the second guarding signal VG2 is transmitted to the first electrodes 121b and the second electrodes 122a at the same time. Therefore, the touch sensing signal will not interfere by the parasite capacitance of the wires, thereby reducing the output loading of the multiplexers.

Figure 9:
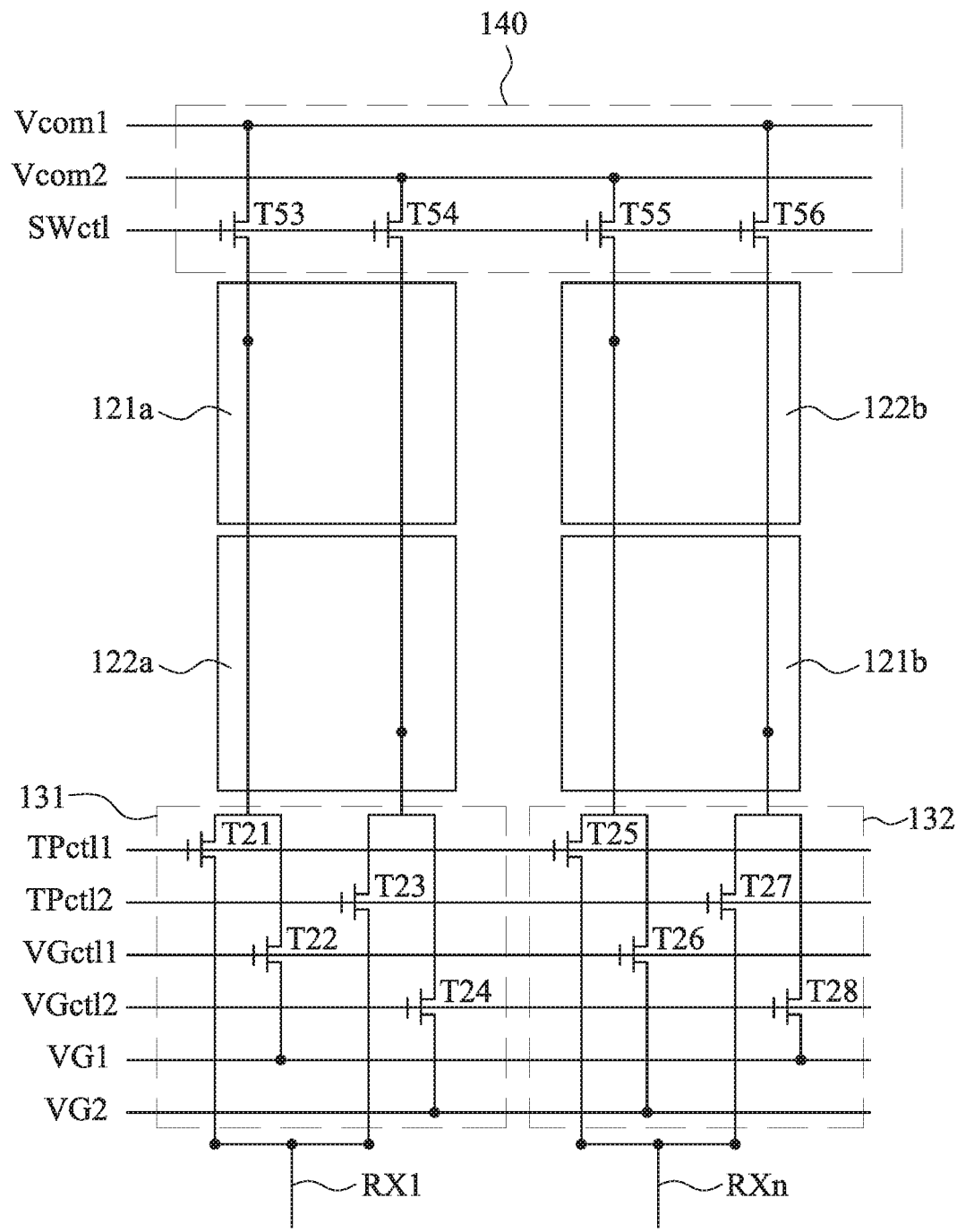
FIG. 9 is a partially enlarged schematic diagram illustrating the touch display panel according to a ninth embodiment of this disclosure.

Reference is made to FIG. 9, which is a partially enlarged schematic diagram illustrating the touch display panel according to a ninth embodiment of this disclosure. The ninth embodiment is similar with the seventh embodiment (as shown in FIG. 7), and the difference is that the implementation of the switch circuit 140. The switch circuit 140 of the ninth embodiment is configured to receive the switching control signal SWctl, the first common signal Vcom1 and the second common signal Vcom2 outputted by the touch circuit 110. The switch circuit 140 includes the switch T53, the switch T54, the switch T55 and the switch T56. The first node of the switch T53 is configured to receive the first common signal Vcom1. The second node of the switch T53 is electrically connected to the first electrode 121a and the control node of the switch T53 is configured to receive the switching control signal SWctl. The first node of the switch T54 is configured to receive the second common signal Vcom2. The second node of the switch T54 is electrically connected to the second electrode 122a and the control node of the switch T54 is configured to receive the switching control signal SWctl. The first node of the switch T55 is configured to receive the second common signal Vcom2. The second node of the switch T55 is electrically connected to the second electrode 122b and the control node of the switch T55 is configured to receive the switching control signal SWctl. The first node of the switch T56 is configured to receive the first common signal Vcom1. The second node of the switch T55 is electrically connected to the first electrode 121b and the control node of the switch T55 is configured to receive the switching control signal SWctl. In this embodiment, the operation of the switching control signal SWctl is similar with the operation of the seventh embodiment. For the sake of brevity, those descriptions will not be repeated here.

Reference is made to FIG. 10, which is a partially enlarged schematic diagram illustrating the touch display panel according to a tenth embodiment of this disclosure. The tenth embodiment is similar with the eighth embodiment (as shown in FIG. 8), and the difference is that the implementation of the switch circuit 140. The switch circuit 140 of the tenth embodiment is configured to receive the first guarding signal VG1, the second guarding signal VG2, the first guarding control signal VGctl1, the second guarding control signal VGctl2, the switching control signal SWctl, the first common signal Vcom1 and the second common signal Vcom2 outputted by the touch circuit 110. The switch circuit 141 includes the switch T57, the switch T58, the switch T59 and the switch T60. The first node of the switch T57 is configured to receive the first guarding signal VG1. The second node of the switch T57 is electrically connected to the first electrode 121a and the control node of the switch T57 is configured to receive the first guarding control signal VGctl1. The first node of the switch T58 is configured to receive the first common signal Vcom1. The second node of the switch T58 is electrically connected to the second node of the switch T57 and the control node of the switch T58 is configured to receive the switching control signal SWctl. The first node of the switch T59 is configured to receive the second guarding signal VG2. The second node of the switch T59 is electrically connected to the second electrode 122a and the control node of the switch T59 is configured to receive the second guarding control signal VGctl2. The first node of the switch T60 is configured to receive the first common signal Vcom1. The second node of the switch T60 is electrically connected to the second node of the switch T59 and the control node of the switch T60 is configured to receive the switching control signal SWctl.

Afterwards, the switch circuit 142 includes the switch T61, the switch T62, the switch T63 and the switch T64. The first node of the switch T61 is configured to receive the second guarding signal VG2. The second node of the switch T61 is electrically connected to the second electrode 122b and the control node of the switch T61 is configured to receive the first guarding control signal VGctl1. The first node of the switch T62 is configured to receive the second common signal Vcom2. The second node of the switch T62 is electrically connected to the second node of the switch T61 and the control node of the switch T62 is configured to receive the switching control signal SWctl. The first node of the switch T63 is configured to receive the first guarding signal VG1. The second node of the switch T63 is electrically connected to the first electrode 121b and the control node of the switch T63 is configured to receive the second guarding control signal VGctl2. The first node of the switch T64 is configured to receive the first common signal Vcom1. The second node of the switch T64 is electrically connected to the second node of the switch T63 and the control node of the switch T64 is configured to receive the switching control signal SWctl. In the embodiment, the operation of the first guarding control signal VGctl1, the second guarding control signal VGctl2 and the switching control signal SWctl are similar with the operation of the eighth embodiment. For the sake of brevity, those descriptions will not be repeated here.

Figure 11:
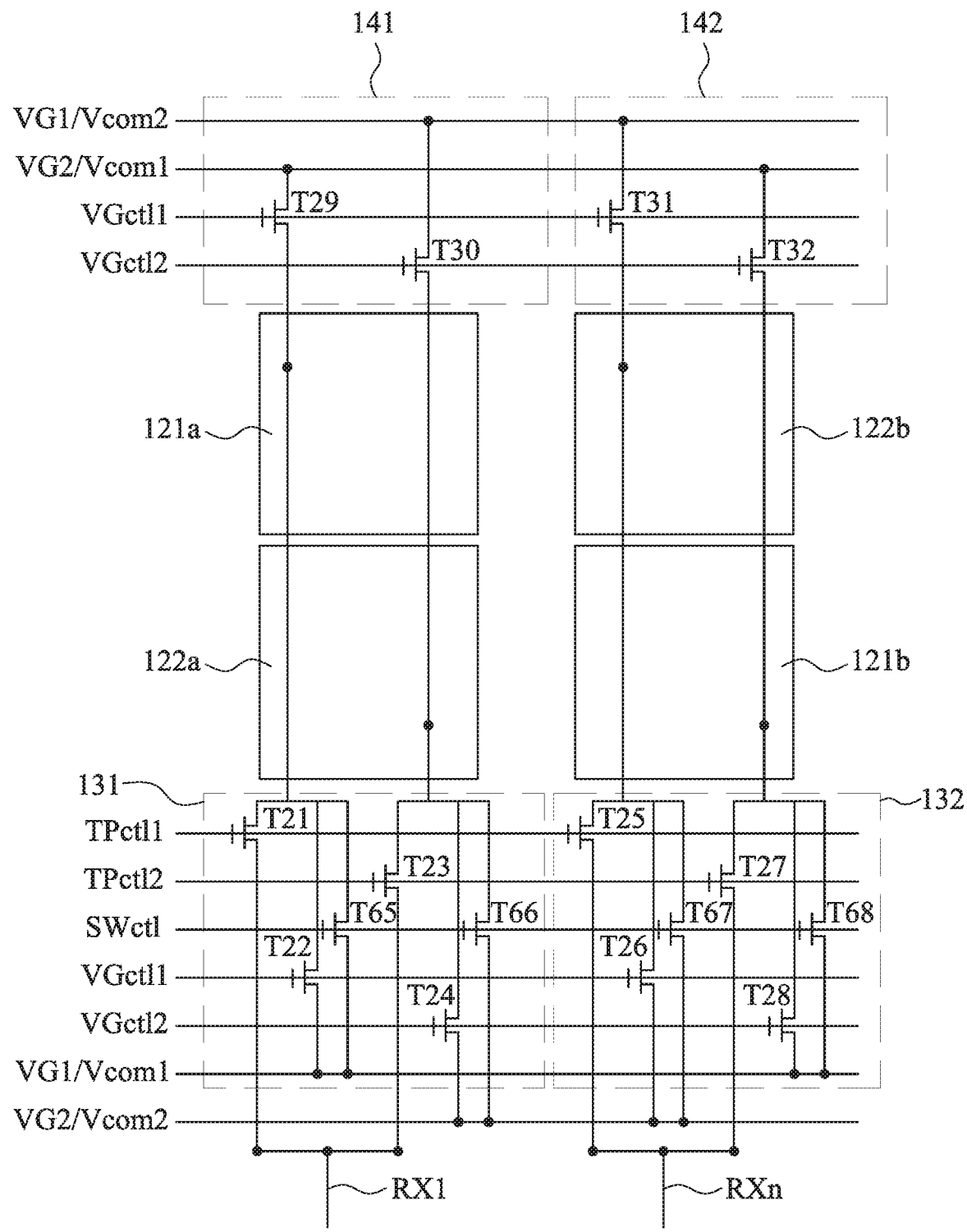
FIG. 11 is a partially enlarged schematic diagram illustrating the touch display panel according to a eleventh embodiment of this disclosure.

Reference is made to FIG. 11, which is a partially enlarged schematic diagram illustrating the touch display panel according to a eleventh embodiment of this disclosure. The eleventh embodiment is similar with the fifth embodiment (as shown in FIG. 5B), and the difference is that the implementation of the multiplexers 131 and 132. The multiplexers 131 and 132 of the eleventh embodiment is configured to receive the first touch control signal TPctl1, the second touch control signal TPctl2, the touch sensing signal RX1 and RXn, the first guarding signal VG1, the second guarding signal VG2, the first guarding control signal VGctl1, the second guarding control signal VGctl2, the switching control signal SWctl, the first common signal Vcom1 and the second common signal Vcom2 outputted by the touch circuit 110.

Afterwards, the multiplexer 131 includes the switch T21, the switch T22, the switch T23, the switch T24, the switch T65 and the switch T66. The coupling method of the switches T21~T24 has described as above, and for the sake of brevity, those descriptions will not be repeated here. The first node of the switch T65 is electrically connected to the first nodes of the switch T21 and T22. The second node of the switch T65 is configured to receive the first guarding signal VG1 and the control node of the switch T65 is configured to receive the switching control signal SWctl.

The first node of the switch T66 is electrically connected to the first nodes of the switch T23 and T24. The second node of the switch T66 is configured to receive the second guarding signal VG2 and the control node of the switch T66 is configured to receive the switching control signal SWctl.

Afterwards, the multiplexer 132 includes the switch T25, the switch T26, the switch T27, the switch T28, the switch T67 and the switch T68. The coupling method of the switches T25-T28 has described as above, and for the sake of brevity, those descriptions will not be repeated here. The first node of the switch T67 is electrically connected to the first nodes of the switch T25 and T26. The second node of the switch T67 is configured to receive the second guarding signal VG2 and the control node of the switch T67 is configured to receive the switching control signal SWctl. The first node of the switch T68 is electrically connected to the first nodes of the switch T27 and T28. The second node of the switch T68 is configured to receive the first guarding signal VG1 and the control node of the switch T68 is configured to receive the switching control signal SWctl. In this embodiment, the operation of the first guarding control signal VGctl1, the second guarding control signal VGctl2 and the switching control signal SWctl are similar with the operation of embodiment. For the sake of brevity, those descriptions will not be repeated here.

As can be appreciated from the foregoing embodiments, when the control chip outputs the touch sensing signal to one of the touch sensing electrode, the control chip simultaneously transmits the driving signal to other touch sensing electrodes, so that the touch sensing signal will not interfere by the parasite capacitance of the transmission path, thereby reducing the output loading of the multiplexers. Therefore, the disclosure is capable of reducing the resistance and capacitance loading of the far end of the touch display panel.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A touch display panel, comprising:
    a touch circuit;
    a touch electrode layer, comprising a plurality of first electrodes;
    a plurality of multiplexers, each of the multiplexers is electrically coupled to the touch circuit and the plurality of first electrodes, and configured to receive a touch sensing signal, a guarding signal, a first guarding control signal, a second guarding control signal, a first touch control signal, and a second touch control signal from the touch circuit, and output the touch sensing signal and the guarding signal according to the first guarding control signal, the second guarding control signal, the first touch control signal, and the second touch control signal; and
    a switch circuit, comprising a plurality of switch units, each of the switch units is electrically coupled to the plurality of first electrodes, and configured to receive the guarding signal, the first guarding control signal, and the second guarding control signal from the touch circuit, and output the guarding signal according to the first guarding control signal and the second guarding control signal.

2. The touch display panel of claim 1, wherein the touch electrode layer comprises a plurality of second electrodes and the plurality of first electrodes and the plurality of second electrodes are staggeredly arranged along a first direction and a second direction.

3. The touch display panel of claim 2, wherein each of the multiplexers further comprising:
    a first switch, comprising a first node, a second node, and a first control node, wherein the first node is electrically coupled to one of the plurality of first electrodes; the second node is configured to receive the touch sensing signal, and the first control node is configured to receive the first touch control signal;
    a second switch, comprising a third node, a fourth node, and a second control node, wherein the third node is electrically coupled to the first node; the fourth node is configured to receive the guarding signal, and the second control node is configured to receive the first guarding control signal;
    a third switch, comprising a fifth node, a sixth node, and a third control node, wherein the fifth node is electrically coupled to one of the plurality of first electrodes or one of the plurality of second electrodes; the sixth node is configured to receive the touch sensing signal, and the third control node is configured to receive the second touch control signal; and
    a fourth switch, comprising a seventh node, an eighth node, and a fourth control node, wherein the seventh node is electrically coupled to the fifth node; the eighth node is configured to receive the guarding signal, and the fourth control node is configured to receive the second guarding control signal.

4. The touch display panel of claim 3, wherein, in a display stage, when the first touch control signal and the second touch control signal switch to a disable level, the first switch and the third switch are turned off; the first guarding control signal and the second guarding control signal switch to an enable level, the second switch and the fourth switch are turned on, and the plurality of first electrodes or the plurality of second electrodes are configured to receive a common signal.

5. The touch display panel of claim 3, wherein a touch sensing stage comprises a plurality of touch sub-stages, in one of the plurality of touch sub-stages, when the first touch control signal and the second guarding control signal switch to an enable level and the second touch control signal and the first guarding control signal switch to a disable level, the first switch and the fourth switch are turned on, and then the plurality of first electrodes are configured to receive the touch sensing signal, and the plurality of first electrodes or the plurality of second electrodes are configured to receive the guarding signal; in another of the touch sub-stages, when the second touch control signal and the first guarding control signal switch to the enable level, the first touch control signal and the second guarding control signal switch to the disable level, and then the plurality of first electrodes or the plurality of second electrodes are configured to receive the touch sensing signal, and the plurality of first electrodes are configured to receive the guarding signal.

6. The touch display panel of claim 2, wherein each switch circuit is further configured to output the guarding signal, a first common signal and a second common signal according to the first guarding control signal, the second guarding control signal, and a switching control signal.

7. The touch display panel of claim 1, wherein each switch circuit is further configured to output the guarding signal and a common signal according to the first guarding control signal, the second guarding control signal, and a switching control signal.

8. The touch display panel of claim 1, wherein the touch electrode layer is disposed on an upper surface of an array substrate, the array substrate comprises a display area and a peripheral area adjacent to the display area; the touch electrode layer is disposed in the display area, and the touch circuit and the multiplexers are disposed in a side of the peripheral area, and the switch circuit is disposed in an opposite side of the side.

9. A touch display panel, comprising:
a touch circuit;
a touch electrode layer, comprising a plurality of first electrodes; and
a plurality of multiplexers, each of the multiplexers is electrically coupled to the touch circuit and the plurality of first electrodes, and configured to receive a touch sensing signal, a first guarding signal, a second guarding signal, a first guarding control signal, a second guarding control signal, a first touch control signal, and a second touch control signal from the touch circuit, and output the touch sensing signal, the first guarding signal and a second guarding signal according to the first guarding control signal, the second guarding control signal, the first touch control signal, and the second touch control signal.

10. The touch display panel of claim 9, wherein the touch electrode layer comprises a plurality of second electrodes and the plurality of first electrodes and the plurality of second electrodes are staggeredly arranged along a first direction and a second direction.

11. The touch display panel of claim 10, wherein each of the multiplexers further comprising:
a first switch, comprising a first node, a second node, and a first control node, wherein the first node is electrically coupled to one of the plurality of first electrodes; the second node is configured to receive the touch sensing signal, and the first control node is configured to receive the first touch control signal;
a second switch, comprising a third node, a fourth node, and a second control node, wherein the third node is electrically coupled to the first node; the fourth node is configured to receive the first guarding signal or the second guarding signal, and the second control node is configured to receive the first guarding control signal;
a third switch, comprising a fifth node, a sixth node, and a third control node, wherein the fifth node is electrically coupled to one of the plurality of first electrodes or one of the plurality of second electrodes; the sixth node is configured to receive the touch sensing signal, and the third control node is configured to receive the second touch control signal; and
a fourth switch, comprising a seventh node, an eighth node, and a fourth control node, wherein the seventh node is electrically coupled to the fifth node; the eighth node is configured to receive the other of the first guarding signal or the second guarding signal, and the fourth control node is configured to receive the second guarding control signal.

12. The touch display panel of claim 11, wherein, in a display stage, when the first touch control signal and the second touch control signal switch to a disable level, the first switch and the third switch are turned off; the first guarding control signal and the second guarding control signal switch to an enable level, the second switch and the fourth switch are turned on, and the plurality of first electrodes are configured to receive a first common signal or a second common signal, and the plurality of second electrodes are configured to receive the other of the first common signal or the second common signal.

13. The touch display panel of claim 11, wherein a touch sensing stage comprises a plurality of touch sub-stages, in one of the plurality of touch sub-stages, when the first touch control signal and the second guarding control signal switch to an enable level and the second touch control signal and the first guarding control signal switch to a disable level, and the first switch and the fourth switch are turned on, and then the plurality of first electrodes are configured to receive the touch sensing signal, and the plurality of second electrodes are configured to receive the first guarding signal or the second guarding signal; in another of the touch sub-stages, when the second touch control signal and the first guarding control signal switch to the enable level and the first touch control signal and the second guarding control signal switch to the disable level, and then the plurality of second electrodes are configured to receive the touch sensing signal, and the plurality of first electrodes are configured to receive the other of the first guarding signal or the second guarding signal.

14. The touch display panel of claim 10, further comprising:
a switch circuit, comprising a plurality of switch units, each of the switch units is electrically coupled to the plurality of first electrodes, and configured to output the first guarding signal and the second guarding signal according to the first guarding control signal and the second guarding control signal.

15. The touch display panel of claim 14, wherein the touch electrode layer is disposed on an upper surface of an array substrate, the array substrate comprises a display area and a peripheral area adjacent to the display area; the touch electrode layer is disposed in the display area, and the touch circuit and the multiplexers are disposed in a side of the peripheral area, and the switch circuit is disposed in an opposite side of the side.

16. The touch display panel of claim 14, wherein the switch circuit further comprising:
a first switch, comprising a first node, a second node, and a first control node, wherein the first node is configured to receive the first guarding signal and the second guarding signal; the second node is electrically coupled to one of the plurality of first electrodes, and the first control node is configured to receive the first guarding control signal; and
a second switch, comprising a third node, a fourth node, and a second control node, wherein the third node is configured to receive the first guarding signal and the second guarding signal; the fourth node is electrically coupled to one of the plurality of first electrodes or one of the plurality of second electrodes, and the second control node is configured to receive the second guarding control signal.

17. The touch display panel of claim 14, wherein the switch circuit further comprising:
- a first switch, comprising a first node, a second node, and a first control node, wherein the first node is configured to receive the first guarding signal; the second node is electrically coupled to one of the plurality of first electrodes, and the first control node is configured to receive the first guarding control signal;
- a second switch, comprising a third node, a fourth node, and a second control node, wherein the third node is configured to receive the first guarding signal; the fourth node is electrically coupled to the second node, and the second control node is configured to receive a switching control signal;
- a third switch, comprising a fifth node, a sixth node, and a third control node, wherein the fifth node is configured to receive the second guarding signal; the sixth node is electrically coupled to one of the plurality of second electrodes, and the third control node is configured to receive the second guarding control signal; and
- a fourth switch, comprising a seventh node, an eighth node, and a fourth control node, wherein the seventh node is configured to receive the second guarding signal; the eighth node is electrically coupled to the sixth node, and the fourth control node is configured to receive the switching control signal.

18. The touch display panel of claim 14, wherein each of the multiplexers is further configured to receive a switching control signal, and each of the multiplexers is configured to output the first guarding signal and the second guarding signal according to the switching control signal.

19. The touch display panel of claim 10, further comprising:
- a switch circuit, comprising a plurality of switch units, each of the switch units is electrically coupled to one of the plurality of first electrodes and one of the plurality of second electrodes, and configured to output a first common signal and a second common signal according to a switching control signal.

20. The touch display panel of claim 10, further comprising:
- a switch circuit, comprising a plurality of switch units, each of the switch units is electrically coupled to one of the plurality of first electrodes and one of the plurality of second electrodes, and configured to output the first guarding signal, the second guarding signal, a first common signal and a second common signal according to the first guarding control signal, the second guarding control signal, a switching control signal.

21. The touch display panel of claim 9, further comprising:
- a switch circuit, comprising a plurality of switch units, each of the switch units is electrically coupled to the plurality of first electrodes, and configured to output a common signal according to a switching control signal.

22. The touch display panel of claim 9, further comprising:
- a switch circuit, comprising a plurality of switch units, each of the switch units is electrically coupled to the plurality of first electrodes, and configured to output the first guarding signal, the second guarding signal and a common signal according to the first guarding control signal, the second guarding control signal, and a switching control signal.

* * * * *